(12) United States Patent
Kim et al.

(10) Patent No.: US 12,455,258 B2
(45) Date of Patent: Oct. 28, 2025

(54) BIOSENSOR CHIP AND BIOSENSOR CARTRIDGES HAVING THE SAME

(71) Applicant: LG ELECTRONICS INC., Seoul (KR)

(72) Inventors: Kyounghwa Kim, Seoul (KR); Taekyu Choi, Seoul (KR); Younghwan Kim, Seoul (KR); Seonggeun Kim, Seoul (KR); Changseok Kim, Seoul (KR); Kyungho Kong, Seoul (KR); Kyoungtaek Lim, Seoul (KR); Youngrae Lee, Seoul (KR); Inkwan Yeo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 311 days.

(21) Appl. No.: 17/970,411

(22) Filed: Oct. 20, 2022

(65) Prior Publication Data

US 2023/0333050 A1  Oct. 19, 2023

(30) Foreign Application Priority Data

Apr. 19, 2022  (KR) .................. 10-2022-0047913

(51) Int. Cl.
*G01N 27/414*  (2006.01)
*A61B 5/05*  (2021.01)
(Continued)

(52) U.S. Cl.
CPC .......... *G01N 27/4145* (2013.01); *A61B 5/05* (2013.01); *A61B 10/0045* (2013.01);
(Continued)

(58) Field of Classification Search
None
See application file for complete search history.

(56) References Cited

U.S. PATENT DOCUMENTS 9,805,165 B2  10/2017  Xiang et al.
2004/0244151 A1  12/2004  Sakata et al.
(Continued)

FOREIGN PATENT DOCUMENTS

JP  2000-258493 A  9/2000
JP  2003-149192 A  5/2003
(Continued)

OTHER PUBLICATIONS

Cheah, et al., "Integrated Platform Addressing the Finger-Prick Blood Processing Challenges of Point-of-Care Electrical Biomarker Testing", Analytical Chemistry, 94(1):p. 1256-1263, Jan. (Year: 2022).*

(Continued)

*Primary Examiner* — J. Christopher Ball
*Assistant Examiner* — John C Ball
(74) *Attorney, Agent, or Firm* — Birch, Stewart, Kolasch & Birch, LLP

(57) ABSTRACT

A biosensor cartridge can include a circuit board having a connection terminal configured to be electrically connected to an external diagnostic device, a biosensor chip configured to detect a target material from an analysis specimen, and transmit an electrical signal to the connection terminal of the circuit board based on the target material being present in the analysis specimen, the biosensor chip including a reactant configured to react specifically with the target material, and a housing enclosing the circuit board and the biosensor chip, and the connecting terminal being exposed outside of the housing. Also, the biosensor chip includes a plurality of channel areas separated from each other, and the reactant is attached to the plurality of channel areas.

22 Claims, 19 Drawing Sheets

(51) Int. Cl.
  *A61B 10/00* (2006.01)
  *G01N 33/487* (2006.01)
  *G01N 33/543* (2006.01)

(52) U.S. Cl.
  CPC ..... *G01N 27/414* (2013.01); *G01N 33/48785* (2013.01); *G01N 33/5438* (2013.01); *B01L 2200/027* (2013.01); *B01L 2300/0636* (2013.01); *B01L 2300/0645* (2013.01); *B01L 2300/0663* (2013.01); *H01R 2201/20* (2013.01); *H05K 2201/10151* (2013.01)

(56) References Cited

U.S. PATENT DOCUMENTS

| | | |
|---|---|---|
| 2008/0124876 A1 | 5/2008 | Ryu et al. |
| 2015/0268186 A1 | 9/2015 | Pagels |
| 2016/0084793 A1 | 3/2016 | Chen et al. |
| 2019/0041355 A1 | 2/2019 | Merriman et al. |
| 2020/0108385 A1 | 4/2020 | Temiz et al. |
| 2020/0170552 A1 | 6/2020 | Cho et al. |
| 2021/0129133 A1 | 5/2021 | Ohta et al. |
| 2021/0285977 A1 | 9/2021 | Tu et al. |

FOREIGN PATENT DOCUMENTS

| | | |
|---|---|---|
| JP | 2008-46094 A | 2/2008 |
| JP | 2013-83506-3 A | 5/2013 |
| JP | 2020-126077 A | 8/2020 |
| KR | 20-0311804 Y1 | 5/2003 |
| KR | 10-0813398 B1 | 3/2008 |
| KR | 10-2008-0110356 A | 12/2008 |
| KR | 10-2010-0072533 A | 7/2010 |
| KR | 10-2010-0103932 A | 9/2010 |
| KR | 10-2011-0064754 A | 6/2011 |
| KR | 10-2012-0101806 A | 9/2012 |
| KR | 10-2013-0012744 A | 2/2013 |
| KR | 10-1323373 B1 | 10/2013 |
| KR | 10-2014-0120138 A | 10/2014 |
| KR | 10-1507317 B1 | 3/2015 |
| KR | 10-2016-0017684 A | 2/2016 |
| KR | 10-1591379 B1 | 2/2016 |
| KR | 10-2016-0065562 A | 6/2016 |
| KR | 10-2016-0128542 A | 11/2016 |
| KR | 10-2016-0146513 A | 12/2016 |
| KR | 10-1779705 B1 | 9/2017 |
| KR | 10-2030272 B1 | 10/2019 |
| KR | 10-2019-0136580 A | 12/2019 |
| KR | 10-2021-0076854 A | 6/2021 |
| KR | 10-2021-0151487 A | 12/2021 |
| WO | WO2019/208901 A1 | 10/2019 |
| WO | WO 2021/013392 A1 | 1/2021 |
| WO | WO 2021/224907 A1 | 11/2021 |

OTHER PUBLICATIONS

Tran, et al., "Toward Intraoperative Detection of Disseminated Tumor Cells in Lymph Nodes with Silicon Nanowire Field Effect Transistors", ACS Nano, 10(2): p. 2357-2364, Feb (Year: 2016).*
The International Search Report for International Application No. PCT/KR2023/001417, dated May 15, 2023.
The International Search Report for International Application No. PCT/KR2023/001423, dated May 24, 2023.
The International Search Report for International Application No. PCT/KR2023/002760, dated Jun. 20, 2023.
The International Search Report for International Application No. PCT/KR2023/002762, dated Jun. 20, 2023.
The International Search Report for International Application No. PCT/KR2023/002765, dated Jun. 20, 2023.
U.S. Appl. No. 17/993,833, filed Nov. 23, 2022.
U.S. Appl. No. 17/993,841, filed Nov. 23, 2022.
U.S. Appl. No. 17/993,351, filed Nov. 23, 2022.
U.S. Appl. No. 17/993,676, filed Nov. 23, 2022.

* cited by examiner

BIOSENSOR CHIP AND BIOSENSOR CARTRIDGES HAVING THE SAME

CROSS-REFERENCE TO RELATED APPLICATIONS

This application claims priority to Korean Patent Application No. 10-2022-0047913 filed in the Republic of Korea, on Apr. 19, 2022, the entirety of which is hereby incorporated by reference into the present application.

BACKGROUND

Field

This disclosure relates to a biosensor chip and a biosensor cartridge having the same.

Description of the Related Art

Recently, as diseases having a high infectivity spread, a need for rapid diagnosis and self-diagnosis of the disease in medical fields, such as homes, hospitals, and public health centers, is increasing.

Therefore, it is desirable to develop an immunoassay platform that does not require specialized knowledge or complicated procedures and has a short analysis time.

A biosensor generates an electrical, optical signal, and a color that changes according to a selective reaction between probe material having reactivity for a specific target material contained in a body fluid such as sweat and saliva, or in biological substances such as blood or urine, and the target material. Accordingly, the presence of a specific target material can be checked by using the biosensor.

Conventionally, a strip-type rapid kit has been widely used, and simple color development is performed by determining whether a bio-target material having a certain concentration or higher is present.

However, in the situation of labeling the target material by color development, the conversion of color development may be inaccurate depending on the concentration of the target material, and the color development must be visually determined and can be hard to see or difficult to distinguish for a layperson. Therefore, the accuracy is different depending on the user who makes the determination.

To compensate for this, a biosensor that generates an electrical signal has been proposed.

In a biosensor that generates an electrical signal, a target material is coupled to a small thin film semiconductor structure, an electrical conductivity of the semiconductor structure is changed by the target material, and the target material is detected through a change in electrical conductivity. In particular, when a target material is combined in a channel, if an electrochemical reaction occurs or the target material itself has a charge, electrons or holes in the semiconductor structure are accumulated or depleted due to the electric field effect caused by the combination of the probe material and the target material. Thus, the electrical conductivity is changed, which is read as a change in the amount of current. In such an electrochemical-based biosensor, the resistance of an electrode itself and the interfacial property of a channel where the electrochemical reaction occurs are very important.

As a channel for this, a graphene-based biosensor has been proposed. For example, in Korean Patent No. 2016-0128542, a biosensor using graphene is described only with respect to the attachment of a linker or a receptor for bonding probe material on an electrode of graphene, but application of the biosensor to a product is not described.

In addition, Korean Patent Publication No. 2016-0146513 describes a pattern of a sensor unit and an electrode unit of a sensor itself, but such a biosensor is described to be directly attached to a human body and used. Accordingly, there is a problem in stability and reaction reliability.

SUMMARY OF THE DISCLOSURE

The disclosure has been made in view of the above problems, and can provide a biosensor cartridge including a sensor chip, and provide a biosensor chip including a graphene channel.

The disclosure can further provide a biosensor capable of extending reactivity by inducing a reaction with a target material through a plurality of channels by using a transistor structure using graphene channels in a biosensor chip.

The disclosure can further provide a biosensor capable of receiving and transmitting electrical signals while securing the maximum number of channels by applying an optimized pattern structure of a biosensor chip having a plurality of channels in the biosensor cartridge.

The disclosure can further provide a multi-target biosensor cartridge by providing a pattern structure of a biosensor chip capable of simultaneously reading a plurality of target materials in a single biosensor chip in the biosensor cartridge.

In accordance with an aspect of the present disclosure, a biosensor cartridge includes: a circuit board including a connection terminal configured to be electrically connectable to an external diagnostic device; a biosensor chip configured to detect a target material from an applied analysis specimen, have a reactant reacting specifically with the target material, and transmit a generated electrical signal to the connection terminal of the circuit board; and a housing configured to accommodate the circuit board and the biosensor chip and surround the circuit board and the biosensor chip with the connection terminal exposed, in which the biosensor chip includes a plurality of channel areas separated from each other, and the reactant is attached to the plurality of channel areas.

The biosensor chip includes: a plurality of channels in which the plurality of channel areas are respectively formed; a source electrode and a drain electrode that overlap with opposite ends of each of the channels and are formed to be spaced apart from each other; and a gate electrode that is spaced apart from the source electrode and the drain electrode, and applies a bias voltage to the analysis specimen.

In the biosensor chip, the plurality of channels are disposed on a substrate, and the source electrode and the drain electrode are formed of the same metal layer as the channel area of the plurality of channels.

The housing includes an accommodating portion that exposes the plurality of channel areas and the gate electrode of the biosensor chip, and accommodates the analysis specimen.

The accommodating portion of the housing has an inclined area whose diameter is gradually decreased from an upper surface, and a distal end of the accommodating portion exposes the plurality of channel areas and the gate electrode of the biosensor chip inside the housing.

The biosensor chip further includes a passivation layer that covers the entire biosensor chip, except for an open area over an upper portion of the channel area and the gate electrode.

In an open area of the biosensor chip exposed by the accommodating portion, one of the source electrode or the drain electrode is disposed in a center of the open area, and the other one is disposed spaced apart from the source electrode or the drain electrode to surround an electrode of the center, one end of each of the channels overlaps with the source electrode and the other end overlaps with the drain electrode.

The plurality of channels are disposed to be spaced apart at the same angle from the center of the open area.

When the electrode of the center is formed in a circular shape, the other electrode surrounding the electrode of the center is formed in a ring shape.

The gate electrode surrounds the other electrode having a ring shape, and is formed to be spaced apart from the other electrode.

An area of the gate electrode is the largest area in the open area.

The biosensor chip further includes a source pad, a drain pad, and a gate pad that are connected to the source electrode, the drain electrode, and the gate electrode, respectively, and receive and transmit an electrical signal to the circuit board, in which the source pad, drain pad, and gate pad are formed of the same metal layer as the source electrode, the drain electrode, and the gate electrode.

The source pad, the drain pad, and the gate pad are disposed in a line at one end of the biosensor chip.

The source pad, the drain pad, and the gate pad are formed in an edge area of the biosensor chip respectively.

The biosensor chip includes: a first channel group to which a first reactant reacting with a first target material is attached; and a second channel group to which a second reactant reacting with a second target material different from the first target material is attached.

The source electrode and the drain electrode of the biosensor chip include: a first drain electrode formed at a center of the open area; a common source electrode which is spaced apart from the first drain electrode, and surrounds the first drain electrode; and a second drain electrode which is spaced apart from the common source electrode, and surrounds the common source electrode.

The first channel group is disposed between the first drain electrode and the common source electrode, and the second channel group is disposed between the common source electrode and the second drain electrode.

The first channel group and the second channel group include a plurality of channels having the same number, in which the plurality of channels are spaced apart from each other.

One channel of the first channel group and one channel of the second channel group have a spaced distance with each other when overlapping with the common source electrode.

A plurality of channels of the first channel group and the second channel group are disposed on the same radius from the center of the open area.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE EMBODIMENTS

Figure 1:
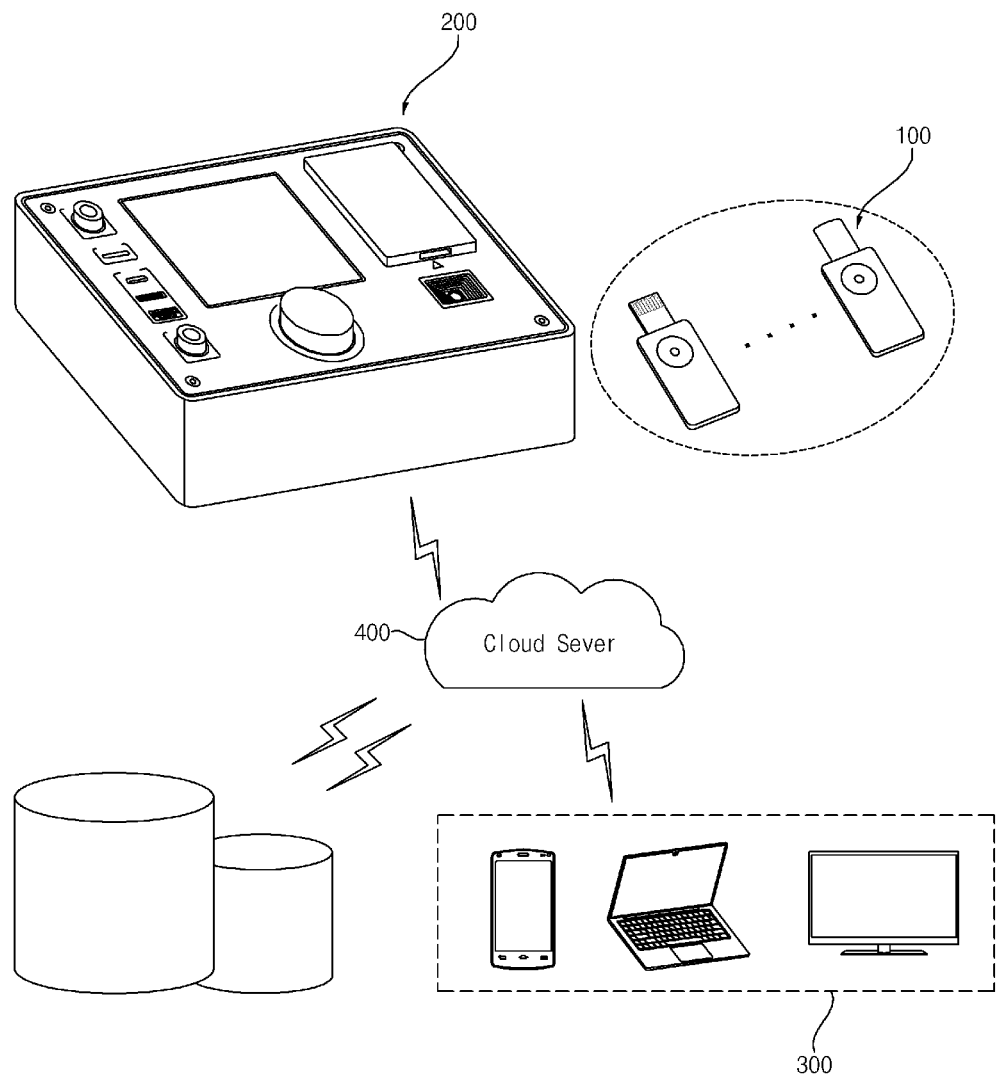
FIG. 1 is a diagram illustrating a biosensor system according to an embodiment of the disclosure.

Expressions referring to directions such as "front (F)/rear (R)/left (Le)/right (Ri)/up (U)/down (D)" mentioned below are defined as shown in the drawings, but, this is for the purpose of explaining an embodiment so that it can be clearly understood, and it is obvious that each direction can be defined differently depending on the reference point.

The use of terms such as first, second, etc. added before the components mentioned below is only to avoid confusion of the referred components, and is irrelevant to the order, importance, or master-slave relationship between the components. For example, an embodiment including only a second component without a first component can also be implemented.

In the drawings, the thickness or size of each component is exaggerated, omitted, or schematically illustrated for convenience and clarity of description. In addition, the size and area of each component do not fully reflect the actual size or area.

In addition, angles and directions mentioned in the process of explaining a structure of the present embodiment are based on those described in the drawings. In the description of the structure in the specification, if a reference point for the angle and a positional relationship are not clearly mentioned, the related drawings can be referred to.

In the present specification, target materials are biomaterials representing a specific substrate, and are interpreted as having the same meaning as analytical bodies or analytes. In the present embodiment, the target material can be an antigen. In the present specification, probe material is a biomaterial that specifically binds to a target material, and is interpreted as having the same meaning as a receptor or an acceptor. In the present embodiment, the probe material can be an antibody.

The electrochemical-based biosensor combines the analytical ability of the electrochemical method with a specificity of biological recognition, and detects a biological recognition phenomenon for a target material as a change in current or potential, by immobilizing or containing a material having biological specificity, e.g., probe material such as an enzyme, an antigen, an antibody, or a biochemical material, on the surface of an electrode.

Hereinafter, a biosensor system according to the present embodiment will be described with reference to FIGS. 1 and 2.

Figure 2:
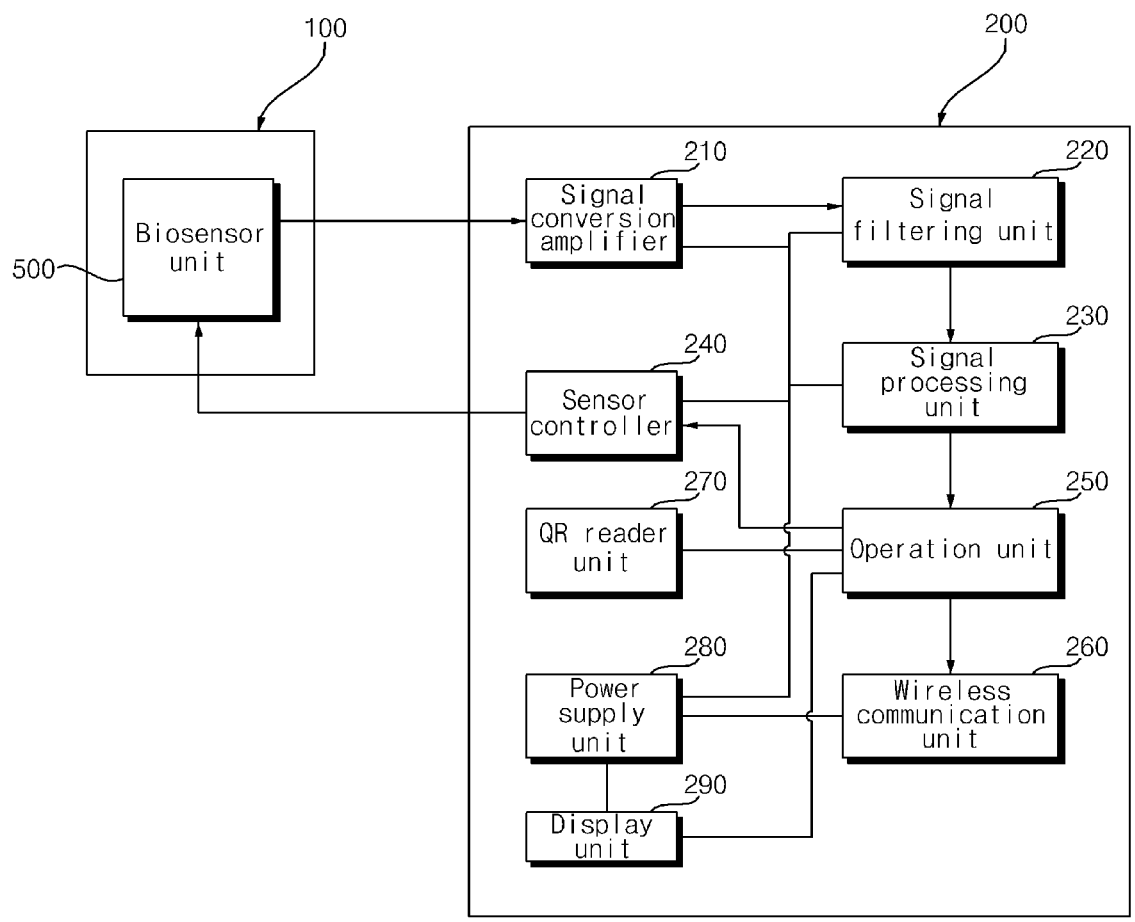
FIG. 2 is a configuration diagram of a biosensor diagnostic device and a biosensor cartridge of FIG. 1 according to an embodiment of the disclosure.

FIG. 1 is a diagram illustrating a biosensor system according to the present embodiment, and FIG. 2 is a configuration diagram of a biosensor diagnostic device 200 and a biosensor cartridge 100 of FIG. 1.

Hereinafter, a biosensor system according to the present embodiment will be described with reference to FIGS. 1 and 2.

FIG. 1 is a diagram illustrating a biosensor system according to the present embodiment, and FIG. 2 is a configuration diagram of a biosensor diagnostic device 200 and a biosensor cartridge 100 of FIG. 1.

Referring to FIG. 1, the biosensor system according to the present embodiment includes a biosensor diagnostic device 200, a plurality of biosensor cartridges 100, and at least one server 400.

When the plurality of biosensor cartridges 100 are inserted, the biosensor diagnostic device 200 reads a detection signal from the biosensor cartridge 100 to read the presence or the absence of a target material.

The biosensor diagnostic device 200 is a portable integrated diagnostic device 200, detects a current change for the presence of a trace amount of a target material from the biosensor cartridge 100, and accordingly diagnoses a disease and delivers a result to a user.

To this end, the biosensor diagnostic device 200 can be portable by integrating each functional block, miniaturizing it, and integrating it in one case or within a housing.

The biosensor diagnostic device 200 can be moved regardless of location, regardless of the presence or absence of an external power source by mounting a battery 281 therein. In addition, the diagnostic device 200 includes a function of compensating a reproducibility and non-uniformity of a sensor by including a pre-processing process of correcting a detection signal from the biosensor cartridge 100 to be able to read a minute signal change.

In addition, the biosensor diagnostic device 200 includes a QR reader that reads a QR code disposed on the rear surface of the biosensor cartridge 100 and receives environmental information for genuine product certification of the biosensor cartridge 100 to perform genuine product certification and a communication module that can transmit and receive signals for genuine product certification with an external cloud server 400.

In the biosensor diagnostic device 200, a program algorithm or application for diagnosing a disease by measuring and analyzing the detection signal from the biosensor cartridge 100 can be installed, and different algorithms are executable according to the type of each biosensor cartridge 100.

In addition, the biosensor diagnostic device 200 includes a display unit 290 for directly displaying the diagnosis result to a user, and is designed to be directly manipulated through a user interface 296, 297, 294.

The detailed configuration of the integrated biosensor diagnostic device 200 will be described later.

Meanwhile, the biosensor system includes a plurality of biosensor cartridges 100 which is inserted into the biosensor diagnostic device 200 to provide detection signals.

Each of the biosensor cartridges 100 is electrically connected to a diagnostic device 200 in which an algorithm capable of measuring and analyzing an electrical detection signal generated in a biosensor chip 500 (e.g., biosensor unit) is installed.

Figure 3:
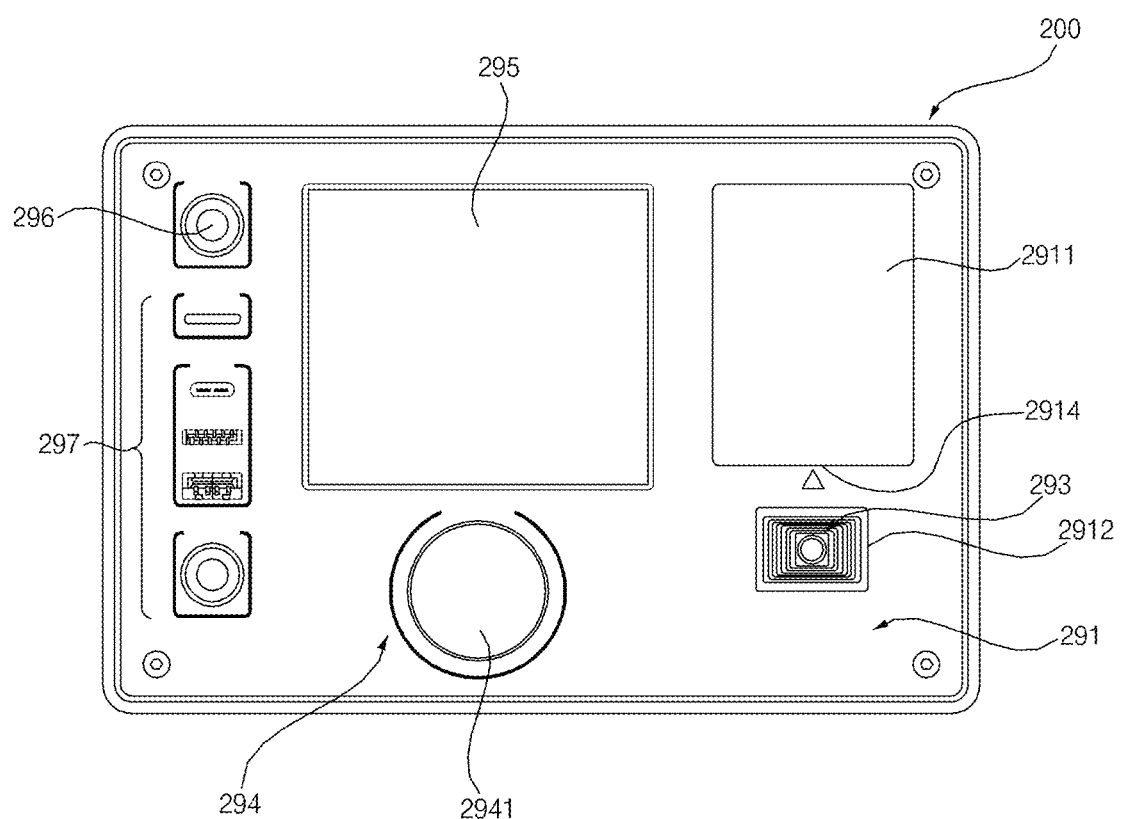
FIG. 3 is a front view of an example of the biosensor diagnostic device of FIG. 1 according to an embodiment of the disclosure.

Specifically, as shown in FIG. 1, the biosensor cartridge 100 can be inserted into and electrically connected to a cartridge insertion module 2911 of the integrated biosensor diagnostic device 200 (e.g., see FIG. 3).

The biosensor cartridge 100 can accommodate the biosensor chip 500 corresponding to a biosensor unit 500 in a housing 110, 120, and the housing 110, 120 can accommodate a circuit board 150 including a circuit pattern that extends to a connection terminal 153 that is connected to an electrode pad of the biosensor chip 500 and inserted into the insertion module 2911 of an external biosensor diagnostic device 200.

The housing 110, 120 can be separated into an upper housing 110 and a lower housing 120, and the upper housing 110 and the lower housing 120 are coupled and fixed while accommodating the biosensor chip 500 and the circuit board 150, thereby constituting a single biosensor cartridge 100.

The biosensor cartridge 100 has a connection terminal 153 for physical and electrical coupling with the biosensor diagnostic device 200 exposed from one end to the outside, and a solution accommodating portion 119 for accommodating a specimen is formed on the surface of the upper housing 110.

The solution accommodating portion 119 exposes an inner part of the biosensor chip 500, and when a specimen is accommodated in the solution accommodating portion 119, the charge concentration of a channel of the biosensor chip 500 is varied according to the antigen-antibody reaction of the biosensor chip 500, so that the current flowing through the electrode of the biosensor chip 500 varies. The varied current is read by the diagnostic device 200 through the connection terminal 153.

In this situation, in order to secure the charge mobility of the biosensor chip 500, a channel can be implemented with various materials, and in particular, a channel can be implemented by using graphene.

The detailed configuration of the biosensor cartridge 100 will be described in detail later.

Meanwhile, the biosensor system can include at least one server 400.

The server 400 can be a manufacturer server 400, and the server 400 can include a processor capable of processing a program. The function of the server 400 can be performed by the manufacturer's central computer (cloud).

For example, the server 400 can be a server 400 operated by a manufacturer of the biosensor cartridge 100 and the diagnostic device 200. As another example, the server 400 can be a server 400 that is provided in a building, and stores state information on devices in the building or stores content required by home appliances in the building.

The server 400 can store firmware information and diagnostic information on the diagnostic device 200, and transmit certification information on the biosensor cartridge 100 requested from the diagnostic device 200.

The server 400 in a biosensor system can be one of a plurality of cloud servers 400 of a manufacturer, and can be provided within the biosensor system while a plurality of cloud servers 400 are simultaneously included to allow access to one biosensor diagnostic device 200.

As described above, when a plurality of cloud servers 400 can simultaneously access one biosensor diagnostic device 200, the biosensor diagnostic device 200 can match the ranks with respect to the plurality of cloud servers 400, and can send a certification request sequentially from the highest priority. In this situation, if a response signal is not received from the priority server 400, a certification request can be sent to the server 400 of the next priority.

The server 400 can authenticate the biosensor cartridge 100 and provide the certification result to the biosensor diagnostic device 200.

In addition, the server 400 can provide calibration data and update data for the product of a corresponding ID, and can transmit to the communicating biosensor diagnostic device 200.

The server 400 can also generate and distribute an upgraded version of a program for analysis for each biosensor cartridge 100.

To this end, the server 400 can receive history information on the manufacturing date, manufacturing conditions, sensor type, test result, etc. of the biosensor cartridge 100 of a manufacturer from a manufacturing server of a separate manufacturer.

In addition, the server 400 can periodically generate and distribute an upgraded version of a program provided to each diagnostic device 200 by receiving, accumulating, and machine learning the diagnostic result values for a corresponding product.

Meanwhile, the biosensor system of the present embodiment can further include a plurality of user terminals 300, but is not limited thereto.

When the user terminal 300 is included in the system, the biosensor diagnostic device 200 or the cloud server 400 can transmit data on the diagnosis result to the communicating user terminal 300.

To this end, a dedicated application for the user terminal 300 can be provided from the manufacturer server 400, and various processing of diagnostic data is possible by storing and executing the application in the user terminal 300.

For example, when a user is infected with the same disease for a long period of time, data processing is possible so that periodic test results can be accumulated and displayed, and the processed results can be provided to the user terminal 300 through an application. Accordingly, the user terminal 300 can determine the prognosis for the disease and the expected treatment time or expected recovery time.

The user terminal 300 can be, for example, a laptop, a smart phone, a tablet, or the like on which an application is installed.

The user terminal 300 can communicate directly with the diagnostic device 200 or the server 400 through a network, and the diagnostic device 200 and the server 400 can also communicate directly through a network.

In this situation, wireless communication technologies such as, IEEE 802.11 WLAN, IEEE 802.15 WPAN, UWB, Wi-Fi, ZIGBEE, Z-wave, and BLUETOOTH can be applied to the network, and can include a wireless communication unit 260 of each device (the user terminal 300 and the diagnostic device 200) to apply at least one or more communication technologies.

The wireless communication unit 260 (e.g., a wireless communication transceiver or interface) can be changed depending on the communication method of other devices (the user terminal 300 and the diagnostic device 200) or the server 400 that is a target to communicate with.

As described above, in the biosensor system, the connection terminal 153 of the biosensor cartridge 100 accommodating the specimen is inserted into and electrically connected to the portable integrated biosensor diagnostic device 200 so that a detection signal is read.

The functional configuration of the biosensor diagnostic device 200 for reading the detection signal is shown in FIG. 2. Referring to FIG. 2, the biosensor diagnostic device 200 includes a plurality of function modules.

Each functional module can be individually packaged and accommodated in the case of one biosensor diagnostic device 200, and a plurality of functional modules can be packaged as one module and accommodated in a case 201, 202.

The biosensor diagnostic device 200 includes a signal conversion amplifier 210, a signal filtering unit 220, a signal processing unit 230, an operation unit 250, a wireless communication unit 260, a power supply unit 280, a display unit 290, a QR reader unit 270, and a sensor controller 240.

The signal conversion amplifier 210 first receives a detection signal transmitted from the biosensor cartridge 100, and converts and amplifies the current value of the detection signal so that the current value can be read by the biosensor diagnostic device 200.

The signal conversion amplifier 210 can have an analog circuit including a resistor that generates a voltage drop according to a changed current value which is a detection signal transmitted from the biosensor cartridge 100, and can further include an amplifying circuit that receives and amplifies such a voltage drop.

The amplified signal is transmitted to the signal filtering unit 220 (e.g., filter circuit) to remove noise and then transmitted to the signal processing unit 230 (e.g., a processor or signal processing circuit). The signal processing unit 230 can convert the amplified analog sensing value from which the noise has been removed into a digital value for a diagnostic operation, and can include an analog-digital converter (ADC) for this purpose.

As described above, the signal conversion amplifier 210, the signal filtering unit 220, and the signal processing unit 230 can all be implemented as a single integrated circuit (IC) chip or one or more processors. Such an integrated circuit chip can correspond to a cartridge insertion module 2911 in FIG. 3.

The sensor controller 240 can provide a reference voltage whose level is changed according to the control of the operation unit 250 to the connection terminal 153 of the connected biosensor cartridge 100, and the biosensor cartridge 100 receives a reference voltage having a varied level from the sensor controller 240 and flows a current value changed by a varied resistance value of a channel to the connection terminal 153. The sensor controller 240 can be mounted together as a voltage level conversion circuit in the integrated circuit chip.

Meanwhile, the biosensor diagnostic device 200 includes an operation unit 250 for controlling the operation of the diagnostic device 200 and reading a received digitized detection value.

The control of the diagnostic device 200 can include a separate controller, but it is possible to simultaneously read whether a detection value is detected and control the operation of the entire diagnostic device by executing a program stored in one controller or a processor.

In this situation, the operation unit 250 can be implemented as a separate integrated circuit chip, and can be mounted in a main board 255.

The operation unit 250 can read whether there exists a target material for the detection value according to the reading program, process the result and provide the result to the display unit 290. In addition, such a reading result can be transmitted to a cloud server 400 and a user terminal 300 through a wireless communication unit 260.

The operation unit 250 can also control the operation of the diagnostic device 200 for the reading of the result. For example, when the connection terminal 153 of the biosensor cartridge 100 is inserted into the cartridge insertion module 2911, the operation unit 250 can detect the insertion and transmit a QR reading command to the QR reader unit 270.

Accordingly, the QR reader unit 270 performs an operation for reading the QR code attached to the rear surface of the cartridge 100 inserted into the cartridge insertion module 2911, and transmits the information back to the operation unit 250.

The operation unit 250 receives the QR information, performs an certification request to the cloud server 400 accordingly, and when certification information is received from the cloud server 400 and confirmed as genuine, performs reading for the biosensor cartridge 100, and matches the reading result with the certification result of the biosensor cartridge 100 and processes it.

Accordingly, the operation unit 250 can reduce the error by minimizing the time difference of the result matching by simultaneously executing the module control of the diagnostic device 200 and the execution of the read program.

The operation unit 250 can include a memory card as a data storage unit, a library file for diagnosing biomaterials, and an embedded system board equipped with a signal processing device. For example, a memory card capable of storing output signal data is inserted into the embedded system board, and a system OS, driving program, library file for analysis, and the like are stored in the memory card. In addition, signal processing for concentration analysis of biomaterials is calculated through comparison analysis with library files in the CPU of the embedded system board, and the analyzed result is stored again in the memory card. In addition, the wireless communication unit 260 can be mounted together in such an embedded system board, but is not limited thereto.

The biosensor diagnostic device 200 includes a display unit 290 as a user interface, and the display unit 290 includes a liquid crystal display device, a touch panel, and the like to display an analyzed result detected by creating a program considering a user's convenience. As a user interface, it can include various types of terminals, dials, buttons, and the like.

A terminal 297, a power terminal 296, a control dial 294, and the like turn on/off the operation of the biosensor diagnostic device 200, and can be connected to the operation unit 250 to control the operation unit 250 according to a user command. That is, as a user's command is input in the interface 297, 296, 294, and the diagnosis of the biosensor cartridge 100 can be started. The display unit 290 displays the progress process during the diagnosis process, and displays the diagnosis result after the completion of the diagnosis.

The biosensor diagnostic device 200 includes a separate power supply unit 280 capable of applying power to a plurality of modules, and the power supply unit 280 includes a battery 281. Accordingly, it is possible to supply power to the internal module from the battery 281 by charging an external power source, and thus the device 200 can be portable.

Hereinafter, a detailed structure according to an example of the biosensor diagnostic device 200 will be described with reference to FIGS. 3 and 4.

Figure 4:
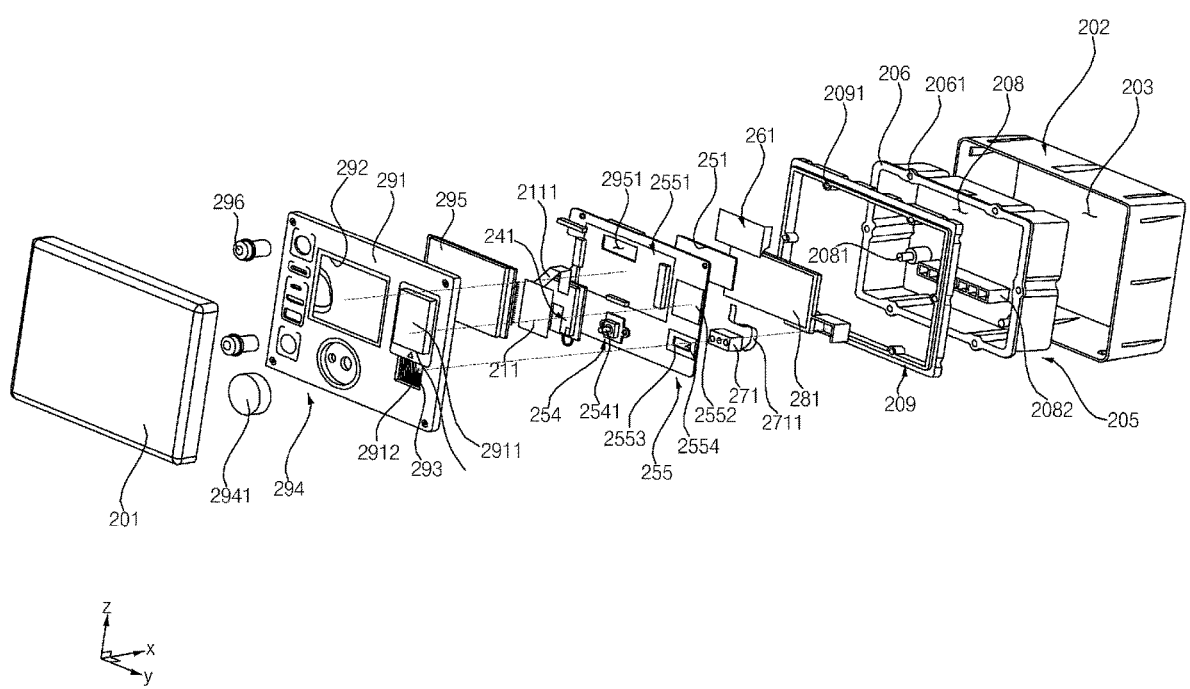
FIG. 4 is an exploded perspective view of the biosensor diagnostic device of FIG. 3 according to an embodiment of the disclosure.

FIG. 3 is a front view of an example of the biosensor diagnostic device 200 of FIG. 1, and FIG. 4 is an exploded perspective view of the biosensor diagnostic device 200 of FIG. 3.

Referring to FIGS. 3 and 4, the biosensor diagnostic device 200 according to the present embodiment is provided as a portable integrated device.

Here, the state of being integrated can include all states recognized as a single device in movement, disposition, and use of the diagnostic device 200. For example, the state of being integrated can mean that that it is located together inside the same case and is integrated by the same case, can mean that it is fixed by being fitted or attached to the same member and integrated by the same member, can mean that it is formed together in the same member to constitute a part of the same member, or can mean that it is wrapped or fixed together by the same member. On the other hand, it may be difficult to be considered as being integrated in the case of being connected by a separate output cable or the like.

The integrated biosensor diagnostic device 200 according to the present embodiment can include a separate inner cover 205 (e.g., inner frame) inside the case 201, 202. A front panel 291 is disposed to cover a plurality of modules accommodated in an accommodating portion 208 of the inner cover 205 and a front surface of the inner cover 205. In this situation, one of a rear case 202 and the inner cover 205 can be omitted.

In the exploded perspective view of FIG. 4, the left side is defined as a front surface and the right side is defined as a rear surface along the X axis where the plurality of modules overlap, and the Y axis and Z axis perpendicular to the X axis are defined as two axes that form a reference plane of the front panel 291 provided to a user.

The case 201, 202 of the biosensor diagnostic device 200 according to the present embodiment can include a front case 201 and a rear case 202. The rear case 202 is formed to have an accommodating portion 203 therein (e.g., hollow area or space), and to have a bottom surface and a side surface.

The front case 201 and the rear case 202 can be disposed to face the accommodating portion 203 while the side surfaces are in contact with each other.

The accommodating portion 203 formed by the front case 201 and the rear case 202 is changed from an open space to a closed space according to the opening and closing of the front case 201.

An outer case accommodating the front case 201 and the rear case 202 simultaneously can be further formed. The outer case can be formed in a box type as shown in FIG. 3, can have a handle formed for easy portability, and have a pedestal formed to dispose the diagnostic device 200 at a certain angle.

The bottom surfaces of the front case 201 and the rear case 202 have the same size and define the total area of the biosensor diagnostic device 200.

The bottom surface can be formed in various shapes, and the shape can be a rectangle as shown in FIG. 4, but is not limited thereto, and can be a circle, an ellipse, a rhombus, or the like.

Meanwhile, when the shape of the bottom surface is a rectangle as shown in FIG. 4, the area is a portable size, and in the situation of a polygon, one side can satisfy 30 cm or less, but it is not limited thereto, and it can be further miniaturized.

The height of the side surface forming the accommodating portion 203 of the rear case 202 can be greater than the height of the side surface of the front case 201, and the inner cover 205 is formed in the accommodating portion 203 of the rear case 202.

The inner cover 205 has the same shape as the rear case 202 so that it can be inserted into the accommodating portion 203 of the rear case 202, and the bottom surface of the inner cover 205 can have a smaller area than the rear case 202, but can be fitted to minimize a space between the side surface and the bottom surface of the rear case 202 and the side surface and the bottom surface of the inner cover 205.

The inner cover 205 serves as a cover that achieves a substantial integration, and when the case 201, 202 is damaged, the inner cover 205 can be separated from the case 201, 202 and replaced.

In addition, since the inner cover 205 is integrated with the rear case 202, one of the two can be omitted.

A plurality of modules are accommodated inside the accommodating portion 208 of the inner cover 205.

A supporter 2081, 2082 (e.g., a post or pillar type member) for supporting a module while defining the position of each module can be formed on the bottom surface of the inner cover 205, and the supporter 2081, 2082 can be variously designed depending on the disposition of the inner modules.

The main board 255 is accommodated in the accommodating portion 208 of the inner cover 205.

The main board 255 can be electrically connected to internal modules for executing a plurality of functions, and as shown in FIG. 4, a display module 295 constituting the display unit 290 and the cartridge insertion module 2911 in which the signal conversion amplifier 210 and the sensor controller 240 are integrated can be disposed in the front direction of the main board 255. In addition, a control switch 2541 of the user interface of the front panel 291 can be disposed on the front surface.

An operation module 251 and a communication module 261 for controlling the operation of the control device and reading a detection signal according to a program can be disposed on the rear surface of the main board 255.

In addition, a QR reading module 271 can be disposed on the rear surface of the main board 255.

A battery 281 for applying power to the main board 255 and each of the functional modules is disposed, and the battery 281 can be disposed adjacent to the bottom surface of the inner cover 205.

Specifically, the front panel 291 includes a reference plane exposed on the front surface of the biosensor diagnostic device 200 as shown in FIG. 3.

The front panel 291 includes a first opening 292 for exposing a display module 295 that is disposed on the rear surface of the front panel 291 and displays an image on the front surface.

The first opening 292 can be covered with a transparent film, but is not limited thereto, and the display unit 290 of the display module 295 can be directly exposed.

A plurality of buttons, dials, and terminals 294, 296, 297 and the like for a user interface can be disposed around the first opening 291.

The plurality of buttons, dials, terminals 294, 296, 297, etc. can be adjusted in various forms according to design. For example, as shown in FIG. 3, a control dial 2941 can be disposed in a lower side of the first opening 292, and a plurality of terminals and dials 296 and 297 can also be disposed on the left side of the first opening 292, thereby receiving operation commands directly from a user.

Meanwhile, the cartridge insertion module 2911 is disposed on the right side of the first opening 292 in the front panel 291, and on the right side of the reference plane.

The cartridge insertion module 2911 protrudes from the reference plane to the front surface, and includes a terminal portion to be electrically connected by inserting the connection terminal 153 of the cartridge in the Z-axis direction.

Accordingly, a terminal portion is formed in a side surface of the insertion module 2911, and the terminal portion can include at least one insertion hole 2914.

The insertion hole 2914 can be implemented in various ways depending on the shape of the connection terminal 153 of the cartridge. When the connection terminal 153 of the cartridge is formed in an SD card chip type, a USB type such as USB-A, USB-C type, or a PIN type, correspondingly, it can be formed to read an electrode of the connection terminal 153.

In addition, when a plurality of insertion holes 2914 are formed to read various types of connection terminal 153, the plurality of insertion holes 2914 can be disposed in parallel along the X-axis direction in the side surface of the insertion module 2911.

A second opening 293 for exposing the QR reading module 271 is disposed on the lower side of the insertion module 2911.

The second opening 293 is formed in a position aligned with the rear surface of the housing 110 of the cartridge 100 in the X-axis direction in a state in which the connection terminal 153 of the cartridge is inserted into the insertion hole 2914 of the cartridge insertion module 2911.

The second opening 293 can be covered with a transparent film, and the second opening 293 can have a rectangular shape, but an area of the second opening 293 can be smaller than that of the first opening 292.

The second opening 293 serves as a passage through which the QR reading module 271 disposed on the rear surface reads the QR code of the cartridge 100 that is placed on the front surface. In the second opening 293, a light guide part 2912 protruding from the rear surface of the front panel 291 to form a sidewall of the second opening 293 in order to maintain a distance between the QR reading module 271 and the cartridge 100 is formed.

The light guide part 2912 can serve as an illumination for photographing of the QR reading module 271 while maintaining the distance of the QR reading module 271. That is, the light guide part 2912 can include a light guide plate formed on a sidewall of the second opening 293.

A main board 255 in which each module is mounted is disposed on the rear surface of the front panel 291, and the main board 255 can also have a shape similar to the bottom surface of the inner cover 205.

The main board 255 is divided into a display area 2551 in which the display module 295 is disposed in correspondence with the area division of the front panel 291, a cartridge area 2552 corresponding to the cartridge insertion module 2911, a QR area 2553 corresponding to the second opening 293, and a control area 254 corresponding to the button and the dial for a user interface (e.g., see FIG. 4).

The main board 255 is a circuit board on which a circuit is patterned on the front and rear surfaces, and a connection terminal or a connector for electrical connection is disposed in each area. Each functional module can be integrated on the main board 255 after connecting the connection terminal of the board and connector and the connection terminal of each module or connector while being physically fixed in a defined area.

As shown in FIG. 4, a terminal module 241 in which the signal conversion amplifier 210, the signal filtering unit 220, and the sensor controller 240 are integrated is mounted in the cartridge area 2552 of the main board 255 corresponding to the cartridge insertion module 2911. The terminal module 241 can be connected to a insertion hole module 211 into which the connection terminal 153 of the cartridge is inserted by a flexible printed circuit board FPCB 2111, and unlike this, can be implemented as a single component.

In addition, the display module 295 can be an LCD or LED panel module disposed in the display area 2551, and a terminal opening 2951 can be formed in the main board 255 in order to connect the operation module 251 on the rear surface of the main board 255 with the battery 281.

The operation unit 250 and the communication module 261 can also be connected to the main board 255 through a connector at the rear surface of the main board 255, but the disposition on the main board 255 is not limited thereto.

Meanwhile, the QR reading module 271 that reads a QR code through a QR opening 2554 formed in the QR area 2553 is disposed on the rear surface of the main board 255, and the QR reading module 271 is also electrically connected to the main board 255 through the flexible printed circuit board FPCB 2711 to receive power and control signals.

A side frame 209 is formed for the disposition and fixing of such modules. The side frame 209 fixes the inner cover 205 and the front panel 291, and the inner cover 205 is fixed to the side frame 209 through a screw hole 2061 extended from one end portion 206 of the side surface. Each module is fixed at a specific position on the main board 255 through a plurality of other fixing parts, the main board 255 is physically fixed by coupling a screw and a screw hole between a plurality of fixing protrusions 2081 and 2082 protruding from the bottom surface of the inner cover 205 and the front panel 291.

Each module and component disposed therebetween is fixed by fixing the main board 255, the front panel 291, and the inner cover 205, and an electrical connection is maintained without being shaken during movement.

In addition, the front panel 291 and the inner cover 205 are fixed together through the screw hole and the screw of the side frame 209 to be integrated. Fixing and assembling of each component proceeds by the screw hole and the screw, thereby making it easy to disassemble and reassemble.

The front case 201, the rear case 202, the inner cover 205, and the front panel 291 can be formed of a resin such as polycarbonate or plastic for portability.

The biosensor diagnostic device 200 is, as shown in FIG. 3, provided to a user by exposing the front panel 291 in a form of having a space for accommodating a plurality of modules therein, and various external cases can be applied.

In particular, in the reference plane of the front panel 291 provided to a user as shown in FIG. 3, a screen of the display module 295 is provided, and various buttons and dials for a user interface are provided. In particular, a power button, a plurality of control buttons, and a USB terminal can be provided. In addition, the cartridge insertion module 2911 is provided to one side of the display module 295, and the connection terminal 153 is inserted into the insertion hole 2914 parallel to the reference plane of the panel 291, so that diagnosis of the biosensor cartridge 100 is possible.

Hereinafter, the biosensor cartridge 100 applied to the present embodiment will be described with reference to FIGS. 5 to 7.

Figure 5A:
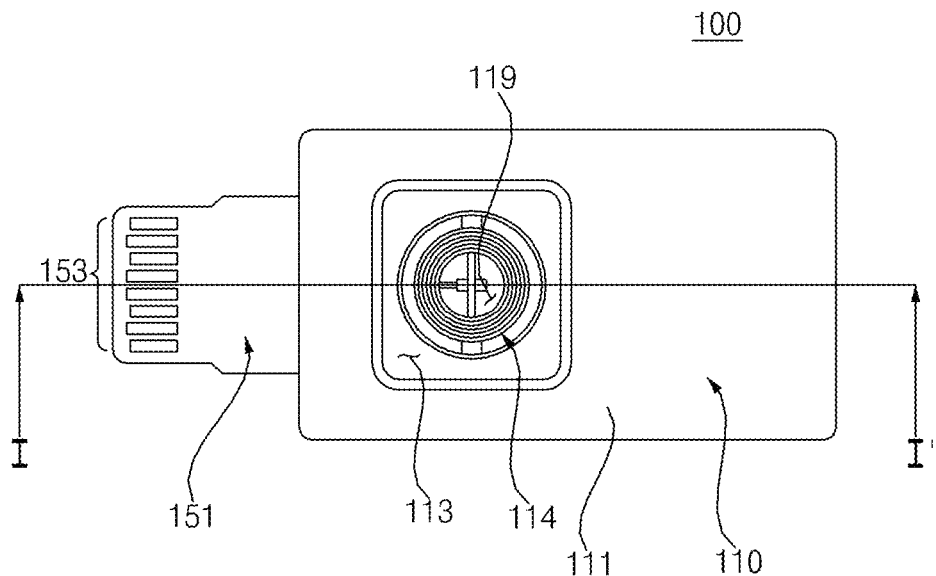
FIGS. 5A and 5B are top and rear views of an example of the biosensor cartridge of FIG. 1 according to an embodiment of the disclosure.
Figure 5B:
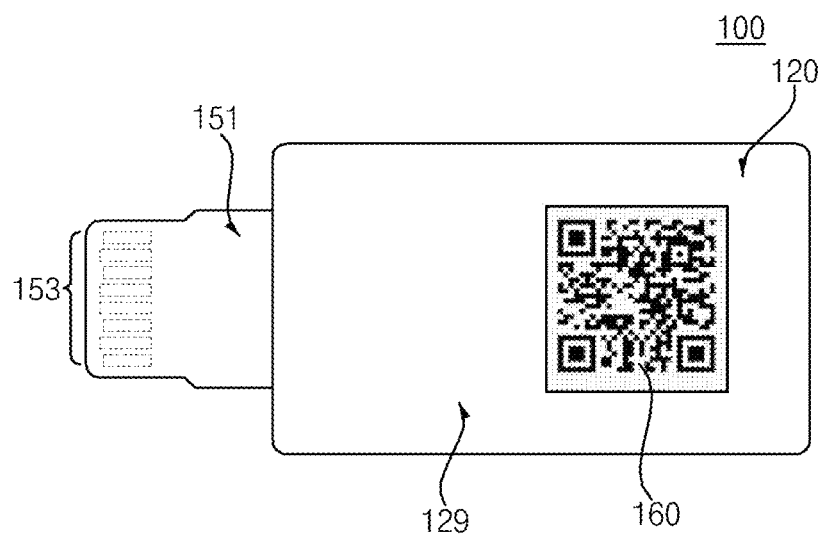
Figure 6:
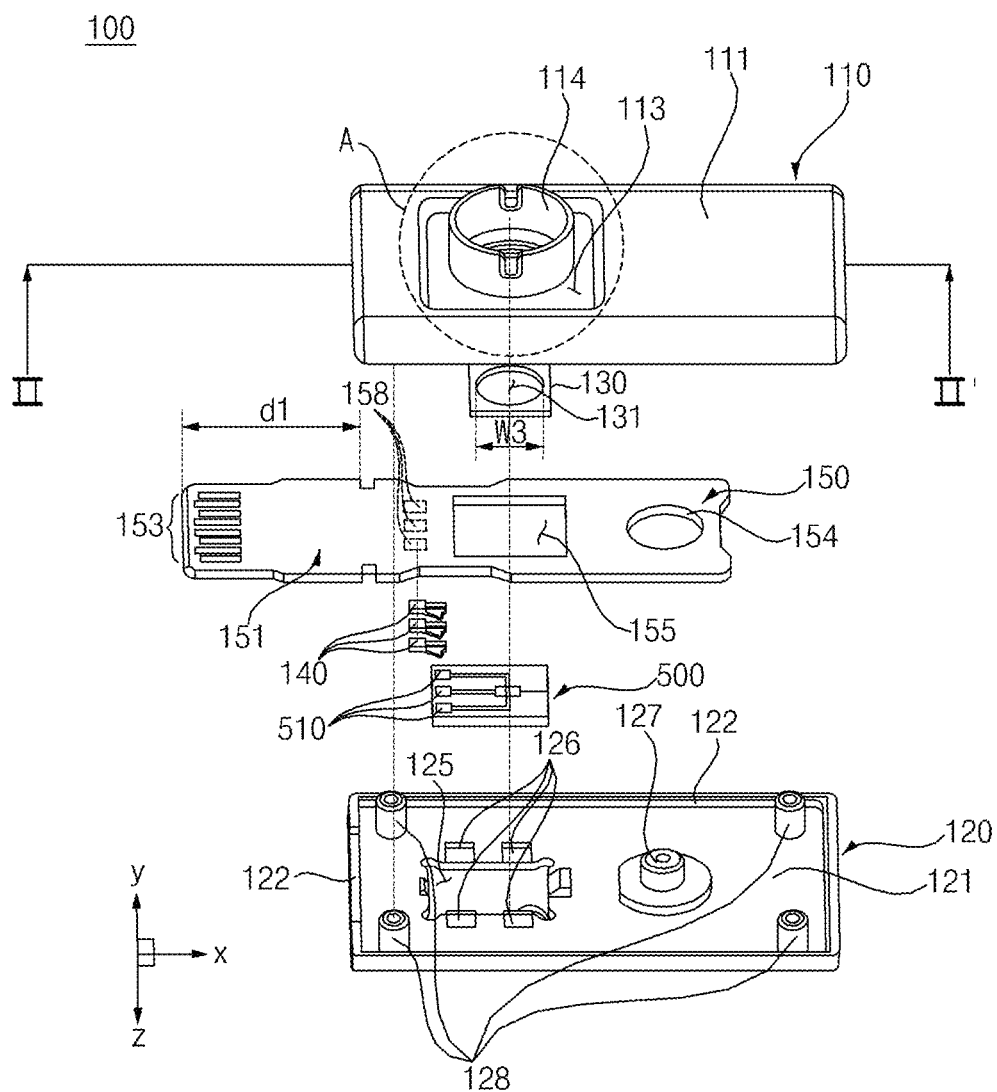
FIG. 6 is an exploded perspective view of an example of the biosensor cartridge of FIG. 1 according to an embodiment of the disclosure.
Figure 7:
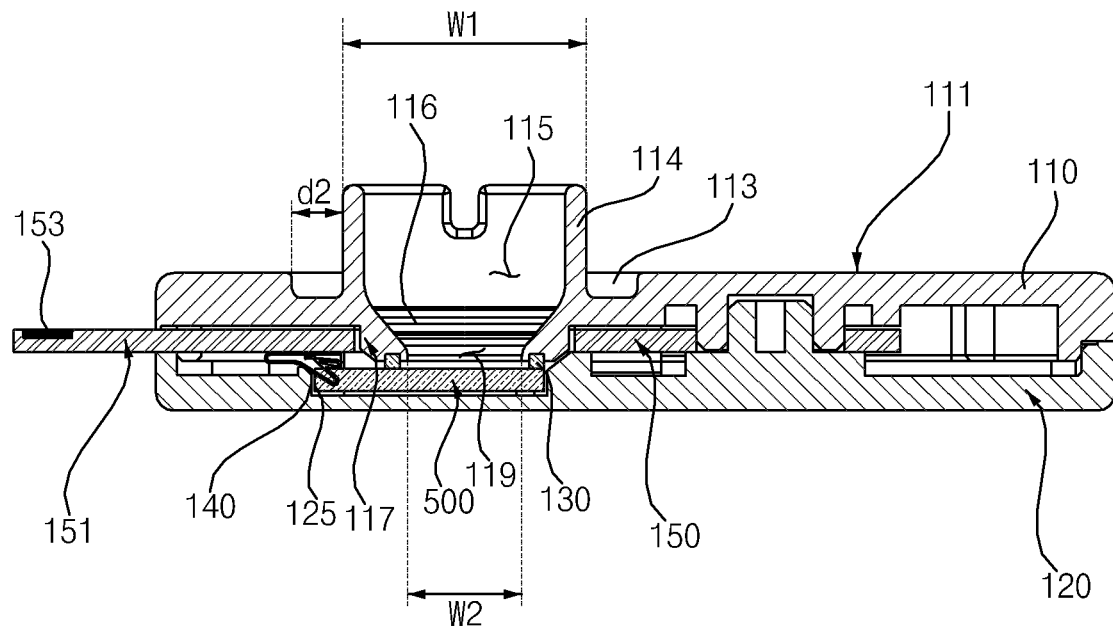
FIG. 7 is a cross-sectional view of the biosensor cartridge of FIGS. 5 and 6 taken along lines I-I' and II-II' according to an embodiment of the disclosure.

FIGS. 5A and 5B are top and rear views of an example of the biosensor cartridge 100 of FIG. 1, FIG. 6 is an exploded perspective view of an example of the biosensor cartridge 100 of FIG. 1, and FIG. 7 is a cross-sectional view of the biosensor cartridge 100 of FIGS. 5 and 6 taken along lines I-I' and II-II'.

FIGS. 5A to 7, the biosensor cartridge 100 according to the present embodiment accommodates a biosensor chip 500 that generates an electrical detection signal according to a target material, and has a structure of including a connection terminal 153 capable of transmitting the detection signal to an external diagnostic device 200.

Specifically, the biosensor cartridge 100 is formed of a bar type housing 110, 120, a partial surface 151 of the circuit board 150 protrudes from the end surface of the side surfaces of the housing 110, 120, and a connection terminal 153 that is inserted into the external diagnostic device 200 and transmits the detection signal is formed on the partial surface 151 of the protruding circuit board 150.

The accommodating portion 119 for accommodating a specimen is formed on an upper surface 111 of the housing 110, 120, and a QR label 160 can be attached to the lower surface or rear surface of the housing 110, 120.

The connection terminal 153, which protrudes from the side surface of the housing 110, 120 and is exposed, is disposed in the same direction as the lower surface of the housing 110, 120 and is not exposed when the cartridge 100 is viewed from the upper surface. Accordingly, it is possible to reduce the risk that the specimen flowing out of the accommodating portion 119 touches the connection terminal 153.

The biosensor cartridge 100 includes housing 110, 120, a biosensor chip 500, and a circuit board 150.

The circuit board 150 is also formed in a bar type, and has one end where a connection terminal 153 is formed so that the circuit board 150 is coupled to the housing 110, 120 as the connection terminal 153 of the circuit board 150 is exposed to the outside of the housing 110, 120, thereby forming the entire shape of cartridge 100.

Specifically, the housing 110, 120 includes a lower housing 120 and an upper housing 110.

The lower housing 120 includes a bar-type bottom surface 121 and a side surface 122 surrounding the bottom surface 121. The bottom surface 121 includes a plurality of coupling protrusions 127, 128 protruding toward the upper housing 110, and each of the coupling protrusions 127, 128 is fitted with a coupling groove of the upper housing 110 so that the upper and lower portions of the housing 110, 120 are coupled and integrated.

A substrate protrusion 127 defining a position while fixing the circuit board 150 toward the upper housing 110 is formed on the bottom surface 121 of the lower housing 120, and a plurality of sensor protrusions 126 defining a chip area 125 in which the biosensor chip 500 is disposed are formed in one side thereof.

The sensor protrusion 126 is disposed to correspond to the size of the biosensor chip 500 to define a chip area 125 in which the biosensor chip 500 is disposed, and is formed to have a certain elasticity so that the biosensor chip 500 can be fitted or inserted therein. Each sensor protrusion 126 has a protruding structure having an inclination toward the chip area 125 so that it is not damaged by the edge of the sensor protrusion 126 when the biosensor chip 500 is mounted. However, since the sensor protrusion 126 does not electrically connect the biosensor chip 500, it can be implemented in various forms, and can be formed as a rail structure for sliding coupling in addition to fitting.

A biosensor chip 500 is disposed in the chip area 125.

The biosensor chip 500 is a semiconductor-based biosensor, and is divided into a sensor area 530 that reacts according to a target material in the specimen through contact with the specimen, and a pad area 510 for transmitting a detection signal generated according to the sensor area 530 to the circuit board 150.

The pad area 510 can be patterned to be disposed in one side of the biosensor chip 500 as shown in FIG. 6, and accordingly, the electrical connection between the circuit board 150 and the biosensor chip 500 is performed in the pad area 510.

The biosensor chip 500 can have different sizes depending on the size of the cartridge, for example, can have a rectangular shape of 8 mm*6 mm, or can have a square shape of 6 mm*6 mm. The size of the biosensor chip 500 can be variously implemented according to the performance of the biosensor chip 500 or the purpose of the biosensor chip 500.

The detailed structure of the biosensor chip 500 will be described in detail later.

The circuit board 150 is disposed on the biosensor chip 500.

The circuit board 150 can be provided as a rigid board like a PCB board, and the biosensor chip 500 is electrically/physically bonded to the lower portion.

The circuit board 150 includes a sensor opening 155 through which a sensor area 530 of the biosensor chip 500 is exposed, and the sensor opening 155 has a size equal to or smaller than that of the biosensor chip 500. In addition, the opening 155 can have a size corresponding to the sensor area 530 of the biosensor chip 500, and has a size to expose the sensor area 530.

The circuit board 150 further includes a protrusion hole 154 through which the substrate protrusion 127 of the lower housing 120 penetrates to fix the circuit board 150, and accordingly, the circuit board 150 and the lower housing 120 are fixed.

The circuit board 150 can be implemented by a plurality of circuit patterns patterned on a base member (not classified by reference numerals, denoted by 150 in the drawing) as the deposition structure thereof, and an insulating layer covering the circuit pattern.

The circuit pattern and the insulating layer can be formed on a rear surface of the base member, and a reinforcing plate can be attached to the front surface of the base member. A rear surface of the circuit board 150 can be defined as a surface facing the lower housing 120, and a front surface of the circuit board 150 can be defined as a surface facing the upper housing 110.

The required strength at the time when a part of the circuit board 150 is used as the connection terminal 153 that is inserted into the diagnostic device 200 can be satisfied by attaching the reinforcing plate to the rear surface of the circuit board 150 as described above.

On the rear surface of the circuit board 150, a circuit pattern including a plurality of connection pads 158 for connecting to the biosensor chip 500 is formed, and a circuit pattern that extends to the connection pad 158 to transmit the detection signal from the connection pad 158 to the external diagnostic device 200 is formed to be connected to the connection terminal 153 of the front surface.

The circuit board 150 can be patterned on both sides to be electrically connected to each other.

Accordingly, the number of connection terminals 153 on the front surface of the circuit board 150 can be equal to or greater than the number of pads of the biosensor chip 500.

The plurality of connection terminals 153 can be spaced apart from each other at one end of the exposed surface 151 of the circuit board 150, e.g., at one end of the circuit board 150 and disposed in parallel.

For example, when the biosensor chip 500 has three pads, the number of the connection pads 158 of the circuit board 150 also satisfies three, and the number of the connection terminal 153 satisfies three or more.

The connection terminal 153 further includes terminals not electrically connected to each connection pad 158 and can be used as a terminal for ESD blocking.

As shown in FIG. 6, the circuit pattern patterned on the front surface of the circuit board 150 can include eight connection terminals 153. In such a connection terminal 153, when the biosensor chip 500 is driven in multi-channel to be connected to a plurality of connection pads 511 and to transmit and receive signals, four connection terminals can be allocated as a connection terminal 153 for transmitting and receiving signals of each pad by connecting to the source pad, drain pad, and gate pad of the biosensor chip 500 corresponding to each channel, and four connection terminals are applicable as a terminal for ESD and incoming detection signal generation.

Such a connection terminal 153 can be formed as an SD card pin type or a USB-A type depending on an embodiment, but a USB-C type having more terminals can also be utilized. Preferably, the connection terminal 153 can be implemented as an SD card pin type, and more terminals than FIG. 5 can be implemented. Thus, the number of pads of the connection terminal 153 can increase in proportion to the number of probe materials applied to the biosensor chip 500, e.g., the number of source electrodes (or the number of drain electrodes).

Meanwhile, the circuit board 150 includes a plurality of coupling grooves, and the plurality of coupling grooves are formed to be able to fit while specifying a position when the upper housing 110 and the lower housing 120 are coupled.

Meanwhile, the upper housing 110 has a structure where the upper surface 111 and the rear surface are different from each other as shown in FIG. 6.

The upper housing 110 faces the lower housing 120 and is coupled to the lower housing 120 and serves as an upper case capable of accommodating the circuit board 150 and the biosensor chip 500 therein. In addition, an accommodating portion 119 exposing the sensor area 530 of the biosensor chip 500 is formed in the upper housing 110 to accommodate a test target specimen.

The upper housing 110 is formed to have rigidity that can firmly support the connecting member 140 by pressing the connecting member 140 with a certain force.

The upper housing 110 and the lower housing 120 can be configured to surround the surfaces of the biosensor chip 500 and the circuit board 150 to protect the biosensor chip 500 and the circuit board 150 from the outside. Due to the strong coupling between the upper housing 110 and the lower housing 120, the specimen provided to the biosensor chip 500 through the accommodating portion 119 can be prevented from leaking into the housing 110, 120.

At this time, when the upper housing 110 and the lower housing 120 are coupled, an opening through which the connection terminal 153 of the circuit board 150 protrudes is formed in one side of the side surface, e.g., in a cross-section, so that the connection terminal 153 is exposed to a cross-section, and is inserted into the insertion hole 2914 of the external diagnostic device 200 as the connection terminal 153 of the cartridge.

The accommodating portion 119 for exposing the sensor area 530 of the biosensor chip 500 and accommodating a specimen is formed on the upper surface 111 of the upper housing 110. The accommodating portion 119 is a space for inducing a reaction with the exposed sensor area 530 by accommodating a test target specimen in a fluid state, e.g., in a liquid state, and the accommodating portion 119 forms a conical channel (e.g., a funnel shape) whose diameter becomes narrower as it approaches the sensor area 530 from the upper surface 111.

The accommodating portion 119 is formed to have an inclined surface 116 such that a diameter W1 of the opening of the upper surface is larger than a diameter W2 of the opening at the distal end of the accommodating portion 119.

The diameter W2 of the opening at the distal end of the accommodating portion 119 can be 3 mm to 6 mm (e.g., 4.5 mm). Preferably, it can satisfy 3.8 to 4.5 mm, more preferably 4 mm to 4.3 mm (e.g., 4.15 mm). However, it is not limited thereto and can be variable depending on the overall size of the cartridge 100 and the size of the biosensor chip 500.

At this time, a first inclination angle θ1 of the inclined surface 116—the angle of the inclined surface 116 with respect to the horizontal direction (x-axis) in which the biosensor chip 500 is placed, when viewed from the cross section in FIG. 7—can be uniform, but can have an inflection point.

That is, the inclination angle increases as it approaches the sensor area 530, and the accommodating portion 119 forms a verticality in the outermost area closest to the sensor area 530, so that the accommodating portion 119 can be changed to a cylindrical passageway.

As described above, since the accommodating portion 119 has the inclined surface 116, a concave groove having a depth that is a height from the upper surface of the upper housing 110 to the sensor area 530 is formed. A specimen is collected in the groove to induce a reaction with the probe material in the sensor area 530.

Meanwhile, the accommodating portion 119 further includes a guard 114 (e.g., side wall) for preventing the specimen of the accommodating portion 119 from flowing to the outside as shown in FIGS. 5A to 9. The guard 114 can be formed in a cylindrical shape, and is formed to surround the opening of the upper surface 111 of the upper housing 110 and protrude upward (in the y-axis) from the upper surface 111.

Accordingly, the diameter W1 of the guard 114 can be the same as the diameter of the opening of the upper surface 111.

A guard groove 113 of a certain depth is formed on the upper surface 111 of the upper housing 110 while surrounding the accommodating portion 119. The guard groove 113 is to prevent the specimen overflowing from the accommodating portion 119 from flowing out of the housing 110 or spilling, and is formed to be recessed by a certain depth from the upper surface 111.

The depth of the guard groove 113 can be formed to satisfy ⅓ to ½ of the thickness of the upper surface of the upper housing 110.

The guard groove 113 can be formed in a circular shape identical to the shape of the guard 114, but can be formed in a rectangular shape having a minimum distance d2 or more from the guard 114 as shown in FIG. 6.

The height of the guard 114 can be greater than the depth of the guard groove 113, and can have a height equal to or smaller than the overall thickness of the housing 110, 120.

As described above, the accommodating portion 119, where the specimen and the sensor area 530 contact each other, firstly has a concave cup shape to accommodate the specimen and provides a space where the target material of the specimen and the probe material of the sensor area 530 react with each other. In addition, the accommodating portion 119 forms a guard 114 surrounding the opening of the upper surface 111 to secure the amount of the specimen by accommodating the overflowing specimen secondarily, and to prevent the risk of exposing the specimen to the outside.

In addition, tertiarily, the guard groove 113 is formed around the guard 114 to accommodate the specimen when the specimen overflows the guard 114 or flows to the outside of the guard 114, thereby preventing the specimen that can contain hazardous substances from exposing to the outside. For example, the guard groove 113 can form a type of moat or overflow/spill containment area.

Thus, the test can be safely performed by changing the shape of the accommodating portion 119 for accommodating the specimen in the upper housing 110.

In addition, a super water-repellent pattern structure can be applied to the accommodating portion 119 so that even if a small amount of the test specimen is put in, all the test specimens are collected into the sensor area 530 of the biosensor chip 500 exposed by the lower opening of the accommodating portion 119 to induce a sufficient reaction.

Meanwhile, the rear surface of the upper housing 110 can include an inclined portion along the inclined surface 116 of the accommodating portion 119.

Accordingly, as shown in FIG. 7, the sensor area 530 of the biosensor chip 500 is exposed upward by the sensor opening 115 of the circuit board 150, and the lower opening of the accommodating portion 119 aligns with the exposed sensor area 530.

At this time, the opening 115 of the circuit board 150 is fitted to surround the rear surface of the inclined surface 116 of the accommodating portion 119, thereby fixing the positions of the circuit board 150 and the upper housing 110.

In addition, to this end, the rear surface of the inclined surface 116 of the accommodating portion 119 is formed to have a vertical step 117 in an area where it meets the opening 115 of the circuit board 150.

That is, the rear surface of the inclined surface 116 of the accommodating portion 119 forms an inclined portion along the inclined surface 116 at an angle equal to or greater than the inclination angle of the inclined surface 116 of the accommodating portion 119, and is inclined at an angle equal to or greater than the inclined surface 116 to form a space coupled to the circuit board 150.

At this time, at a portion to which the opening 155 of the circuit board 150 is coupled, a step 117 corresponding to the cut surface of the opening 155 of the circuit board 150 can be formed for fitting with the opening 155 of the circuit board 150. Accordingly, the step 117 can be formed perpendicular to a horizontal plane (x-axis on which the biosensor chip is placed).

The step 117 can have a spaced distance from the side surface of the opening 155 of the circuit board 150, but is not limited thereto, and can be fitted and coupled. It is easy to fix the circuit board 150 in case of being fitted and coupled without a separation distance, but a separation distance can be formed for tolerance.

In addition, when the rear surface of the circuit board 150 is placed in the lower housing 120, a separation distance for tolerance can be ensured from the rear surface of the upper housing 120.

As described above, the front surface of the circuit board 150 and the rear surface of the upper housing 110 can be coupled with a certain tolerance distance to prevent distortion or bending of the circuit board 150, and to be applied as a buffer for an error in the process to reduce the defect rate.

In addition, even if the separation distance for such a tolerance is included, the circuit board 150 and the housing 110, 120 can be clearly coupled by combining with the upper and lower housings 110 and 120 by a plurality of coupling grooves and coupling holes.

Accordingly, the circuit board 150 is firstly fixed while the step 117 of the rear surface of the accommodating portion 119 and the sensor opening 115 of the circuit board 150 are fitted, and is secondarily fixed while the fixing protrusion 127 of the lower housing 120 and the fixing hole 154 of the circuit board 150 are coupled, so that the position is specified.

Meanwhile, a sealing part 130 can be further formed between the upper housing 110 and the sensor area 530.

The sealing part 130 is formed as a separate element as shown in FIG. 6, and is coupled and compressed at the time of the housing 110, 120 coupling, thereby preventing the specimen from flowing to the outside of the sensor area 530.

In this situation, the sealing part 130 can have a sealing opening 131 having a diameter W3 larger than the diameter W2 of the rear opening of the accommodating portion 119 as shown in FIG. 6, and the rear opening and the sealing opening 131 can be disposed to have a concentric circle. Accordingly, when assembling, as shown in FIG. 7, the sealing part 130 is disposed outside the lower opening of the accommodating portion 119 to form a concave groove.

This is designed to avoid danger that the elastic sealing part 130 is pushed to the sensor area 530 by the compression of the sealing part 130 and covers the sensor area 530 in contact with the specimen, as a tolerance is set when the sealing part 130 is compressed.

As described above, it is possible to ensure the sealing of the specimen while securing the area of the sensor area 530 by adjusting the size of the sealing opening 131 of the sealing part 130 and the opening size of the accommodating portion 119.

Meanwhile, the sealing part 130 can be a closed cell type waterproof pad having elasticity, but is not limited thereto.

Meanwhile, the connection pad 158 formed on the rear surface of the circuit board 150 is formed in the same number as the pad 511 of the biosensor chip 500, and a connecting member 140 is disposed for electrical and physical connection between the connection pad 158 of the circuit board 150 and the pad 511 of the biosensor chip 500.

As shown in FIG. 6, the connecting member 140 can be formed separately for each pad 158, and can be formed as a clip-type elastic contact piece. Such a connecting member 140 can be a C-clip or a spring terminal.

Each connecting member 140 can include a first surface in contact with the pad area 510 of the circuit board 150 and a second surface configured to be elastically deformable by being bent in the length direction of the first surface from one side surface of the first surface.

The first surface is formed to have a certain length and is in contact with the pad area 510 of the circuit board 150, and the second surface is in contact with the pad 511 of the lower biosensor chip 500 and elastically deformed.

To this end, in the state where the connection pad 158 of the circuit board 150 and the first surface are in contact with each other through welding or soldering, when the circuit board 150 is disposed in the lower housing 120 in which the biosensor chip 500 is disposed, a bending portion is elastically deformed as pressure is applied vertically to the connecting member 140 by assembling the upper housing 110 and the lower housing 120.

At this time, the angle is changed so that the second surface is parallel to the first surface as a spring coupling portion is pushed into the inside of the second surface. Thus, the second surface is in contact with the pad 510 of the biosensor chip 500 to maintain a conducting state, so that physical coupling and electrical coupling occur simultaneously.

As described above, since the probe material in the biosensor chip 500 is not exposed to high temperature in a bonding process by performing electrical connection of the biosensor chip 500 with the circuit board 150 without a separate bonding process, it is possible to prevent a problem that protein modification occurs.

That is, in the presence of probe material vulnerable to heat due to the characteristics of the biosensor, the characteristics of the probe material can be maintained by excluding a heating process, and electrical connection between the biosensor chip 500 and the circuit board 150 becomes possible.

Meanwhile, on the rear surface 129 of the lower housing 120 of the biosensor cartridge 100, e.g., the rear surface 129 of the cartridge 100 exposed to the outside, a QR label 160 including a QR code in which sensor information including a product ID and a manufacturing serial number for genuine product certification of the biosensor cartridge 100 is stored is attached.

The QR code can be attached to the central area of the rear surface 129 of the lower housing 120 so that the rear surface 129 of the lower housing 120 of the cartridge 100 can be aligned over the second opening 293 which is the QR opening when the cartridge 100 is coupled with the external diagnostic device 200.

The QR code can include all sensor information for genuine product certification. As an example, it can include biosensor chip 500 information and cartridge information as well as the product ID and manufacturing serial number. The information of the biosensor chip 500 can include the type of probe material activated in the biosensor chip 500, a disease to be diagnosed, a manufacturing date, a manufacturing location, and a manufacturing serial number of the biosensor chip 500. In addition, the cartridge information can include an assembly date, a test date, expiration date, and a sensor ID of the biosensor cartridge 100.

The stored QR code is read from the QR reading module 271 of the diagnostic device 200 at the same time when it is inserted into the diagnostic device 200, and a process for genuine product certification can be performed with the cloud server 400.

The biosensor cannot determine whether it is an imitation or not. Even if it is genuine, sensor errors are often found or decided from accumulated test data after manufacturing and sales. Therefore, a process of classifying the biosensor cartridge 100 in which an error has occurred is required before the test proceeds.

In the situation of the biosensor cartridge 100, it is possible to check an error including a current risk to a corresponding type of the biosensor cartridge 100 through such a certification procedure.

The biosensor cartridge 100 according to the present embodiment does not include a separate memory chip for storing sensor-specific information for such a certification procedure.

When such a memory chip is separately included, the size of the circuit board 150 increases, and the size of the housing 110, 120 increases according to the size of the circuit board 150. In addition, as the circuit of the circuit board 150 becomes complicated, the number of pins used in the connection terminal 153 increases, thereby causing problems in miniaturization and cost of the cartridge 100.

Like the biosensor cartridge 100 according to the present embodiment, by attaching a QR label 160 on which a QR code is printed to the rear surface of the housing, such a memory chip can be replaced, and the time difference between reading of the sensor result and certification can be minimized by reading the QR code almost simultaneously with the coupling of the cartridge 100 and the diagnostic device 200.

Such a QR code can be prevented from being arbitrarily attached and detached by attaching it as a security label 160 such as a VOID label on the rear surface of the lower housing 120.

In such a biosensor cartridge 100, in a state in which the biosensor chip 500 is placed in the lower housing 120, the upper housing 110 coupled to the circuit board 150 to which the connecting member 140 is attached is pressed for assembling with the lower housing 120, so that the biosensor chip 500 and the circuit board 150 are physically and electrically attached and fixed.

In this situation, the attachment of the upper housing 110 and the lower housing 120 can be further strengthened by performing fusion or bonding on an edge attachment area of the upper housing 110 and the lower housing 120.

Such fusion can be performed by ultrasonic fusion, but is not limited thereto, and can be performed through a separate adhesive member.

The edge attachment area formed as described above is continuously formed in the entire edge excluding an open portion through which the connection terminal 153 protrudes, e.g., in the distal end of the side surfaces of the upper housing 110 and the lower housing 120, thereby preventing moisture or foreign substances from penetrating into the interior from the outside.

Figure 8:
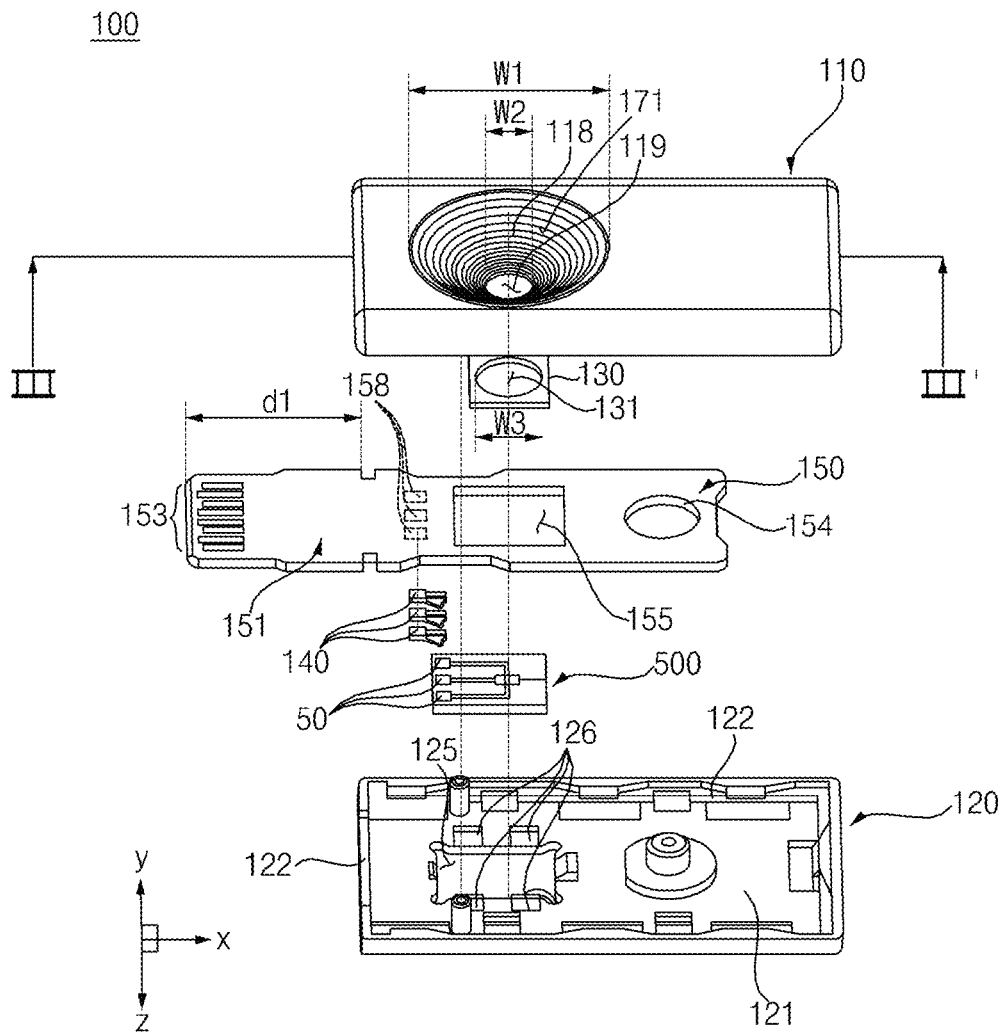
FIG. 8 is an exploded perspective view of another example of the biosensor cartridge of FIG. 1 according to an embodiment of the disclosure.
Figure 9:
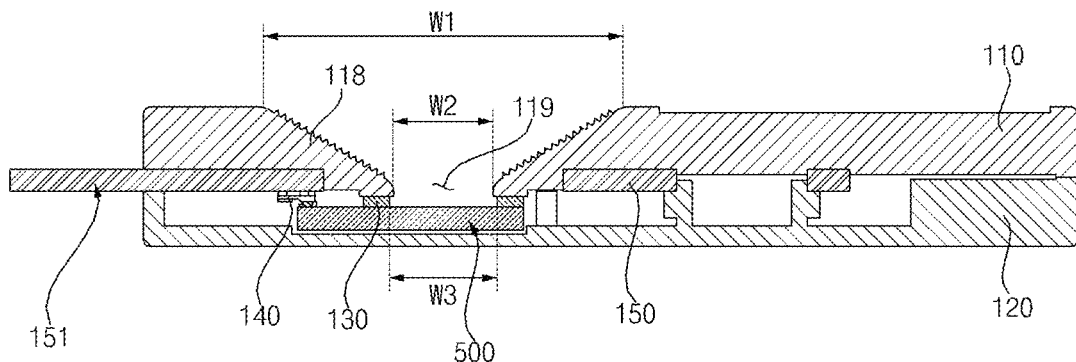
FIG. 9 is a cross-sectional view of the biosensor cartridge of FIG. 8 taken along line III-III' according to an embodiment of the disclosure.

Such a biosensor cartridge 100 can be changed to a configuration shown in FIGS. 8 and 9.

FIG. 8 is an exploded perspective view of another example of the biosensor cartridge 100 of FIG. 1, and FIG. 9 is a cross-sectional view of the biosensor cartridge 100 of FIG. 8 taken along line III-III'.

In the biosensor cartridge 100 of FIGS. 8 and 9, since the configuration of the lower housing 120, the biosensor chip 500, and the circuit board 150 is the same as that of the biosensor cartridge 100 of FIGS. 6 and 7, and the attachment configuration of the upper housing 110 and the lower housing 120 is also the same, a description thereof is omitted.

In the biosensor cartridge 100 of the second embodiment, the accommodating portion 119 can be formed differently from the first embodiment.

Referring to FIGS. 8 and 9, in the biosensor cartridge 100 according to the second embodiment, the accommodating portion 119 for accommodating the specimen in the upper housing 110 and guiding it to the sensor area of the lower biosensor chip 500 is formed.

Specifically, the accommodating portion 119 is a space for inducing a reaction with the exposed sensor area 530 by accommodating a test target specimen in a fluid state, e.g., in a liquid state, and the accommodating portion 119 is concavely recessed from the upper surface to form a conical passage, e.g., a channel or funnel, the diameter of which becomes narrower as it approaches the sensor area 530.

Accordingly, the accommodating portion 119 is formed to have an inclined surface 118 such that the diameter W1 of the opening of the upper surface is larger than the diameter of the opening W2 at the distal end of the accommodating portion 119.

In the accommodating portion 119, since the diameter W1 of the opening of the upper surface is expanded to be wider than the area of the biosensor chip 500, the difference between the diameter W1 of the opening of the upper surface and the diameter W2 of the opening at the distal end of the accommodating portion 119 is significantly large.

For example, the diameter W1 of the opening of the upper surface can satisfy two to three times the diameter W2 of the opening at the distal end of the accommodating portion 119.

As the difference between the diameter W1 of the opening in the upper surface and the diameter W2 of the opening at the distal end of the accommodating portion 119 becomes larger, the accommodating volume of the accommodating portion 119 increases, so that a large amount of specimen can be accommodated.

At this time, the inclination angle of the inclined surface 118—the angle of the inclined surface with respect to the horizontal direction in which the biosensor chip 500 is placed when viewed from the cross section in FIG. 9—can be uniform, but can have an inflection point.

That is, the inclination angle of the accommodating portion 119 increases as it approaches the sensor area 530, the accommodating portion 119 forms a verticality in the outermost area closest to the sensor area 530, so that the accommodating portion 119 can be changed to a cylindrical passageway.

As described above, since the accommodating portion 119 has the inclined surface 118, a concave groove having a depth that is a height from the upper surface of the upper housing 110 to the channel area is formed. A specimen is collected in the groove to induce a reaction with the probe material in the sensor area 530.

As described above, the biosensor cartridge 100 accommodates the biosensor chip 500 inside the housing 110, 120, and is provided to accommodate the circuit board 150 for transmitting the detection information of the biosensor chip 500 to the external diagnostic device 200.

Hereinafter, the biosensor chip 500 of the present embodiment will be described with reference to FIGS. 10 to 15.

Figure 10:
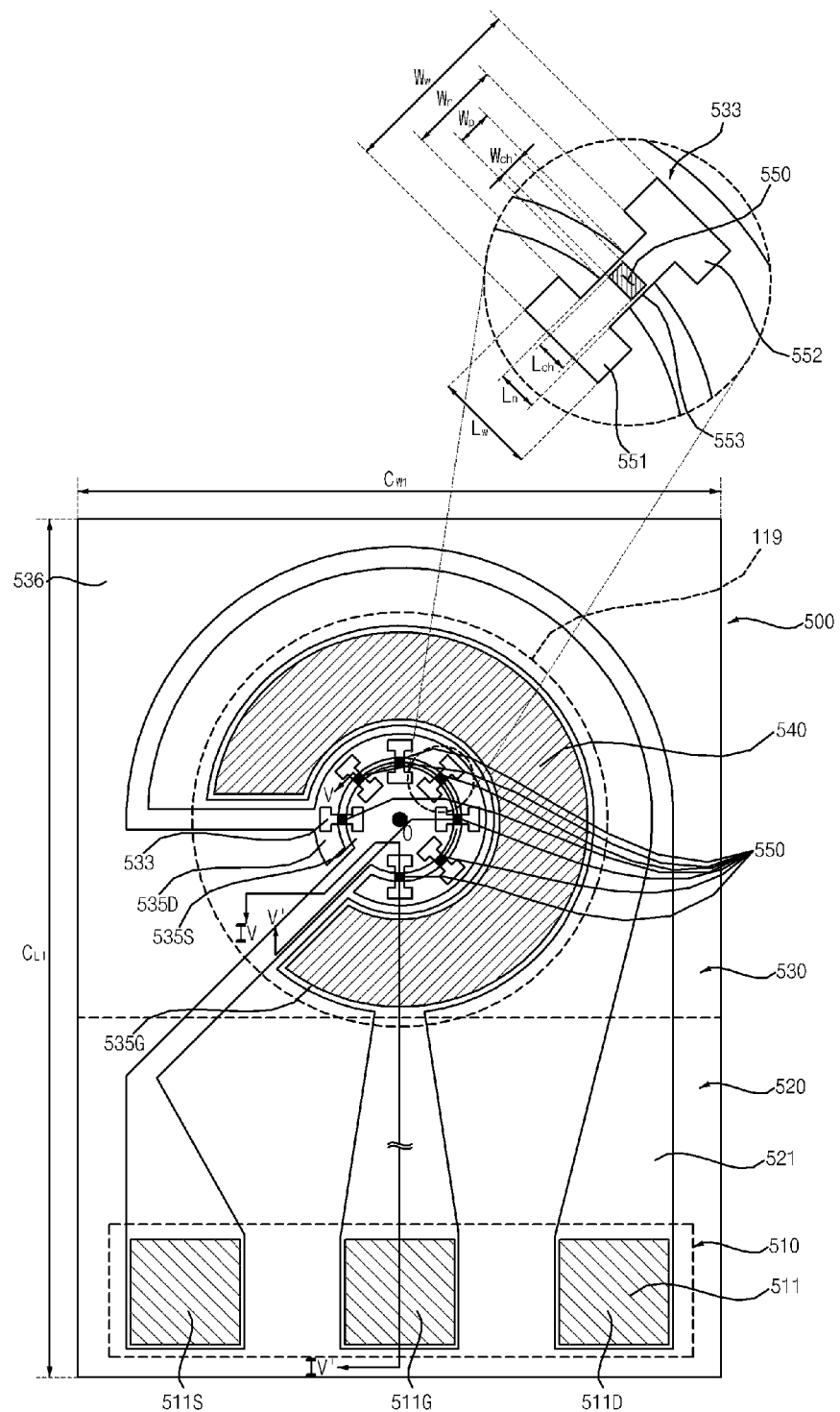
FIG. 10 is a top view of an example of a biosensor chip applicable to the biosensor cartridge of FIGS. 6 to 9 according to an embodiment of the disclosure.
Figure 11:
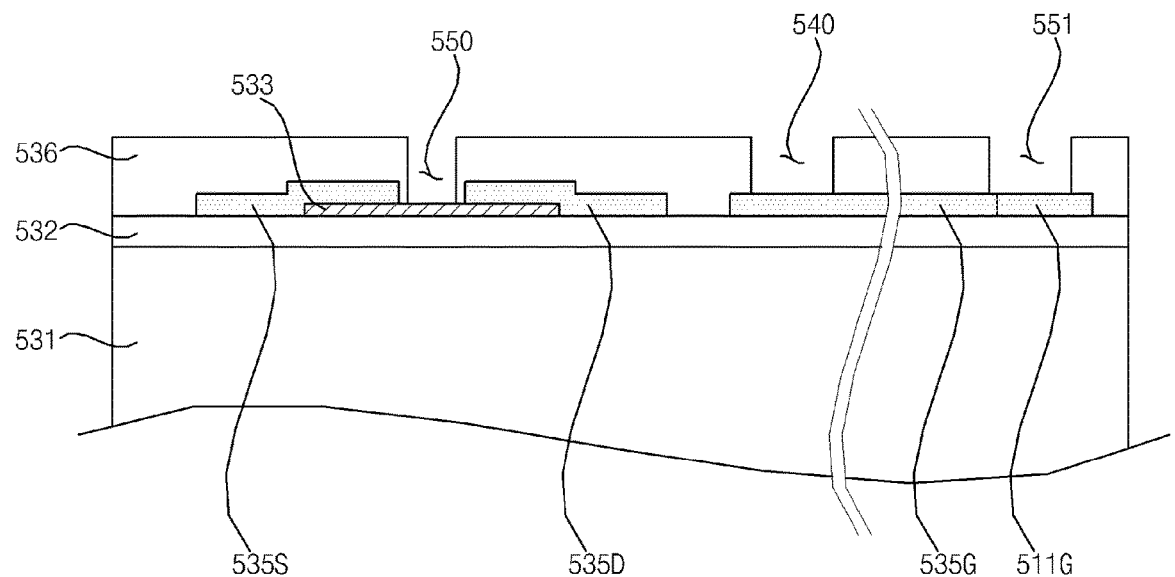
FIG. 11 illustrates the biosensor chip of FIG. 10 taken along IV-IV' according to an embodiment of the disclosure.
Figure 12:
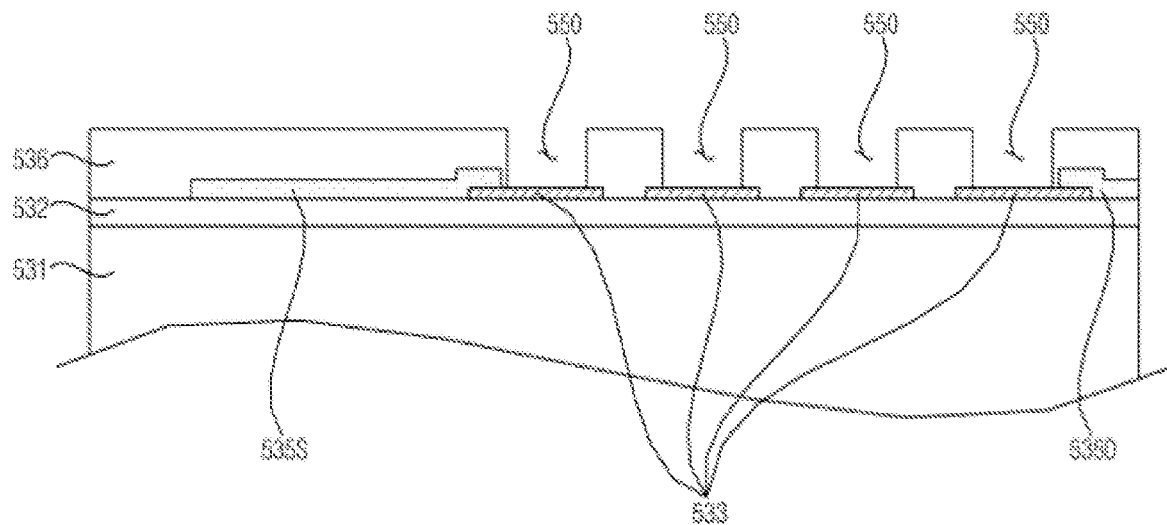
FIG. 12 is a cross-sectional view of the biosensor chip of FIG. 10 taken along line V-V' according to an embodiment of the disclosure.

FIG. 10 is a top view of an example of a biosensor chip applicable to the biosensor cartridge of FIGS. 6 to 9, FIG. 11 illustrates the biosensor chip of FIG. 10 taken along IV-IV', and FIG. 12 is a cross-sectional view of the biosensor chip of FIG. 10 taken along line V-V'.

The biosensor chip 500 detects a target material from a specimen introduced into the inside by the accommodating portion 119 of the biosensor cartridge 100, and transmits an electrical signal generated by reacting with the detected target material to the pad 158 of the circuit board 150 through the electrode pad 511.

For example, the specimen can refer to saliva, a body fluid including sweat, blood, a solution diluted with serum or plasma, and the like, as a biological material.

The biosensor chip 500 is a semiconductor-based biosensor chip 500, and can be manufactured as a biosensor chip 500 to which graphene is applied.

The biosensor chip 500 can have various sizes depending on the type of target material, the number of target materials, and the size of the cartridge 100, and can have, for example, a rectangular shape in which the chip width is shorter than the chip length as shown in FIG. 10.

As described above, when the biosensor chip 500 has a rectangular shape, the chip width Cw1 can satisfy 5.7 to 6.3 mm, the chip length CL1 can satisfy 7.7 to 8.3 mm, and preferably can be formed in the size of 6*8 mm.

Referring to FIGS. 10 to 12, the biosensor chip 500 according to the present embodiment can have a rectangular shaped plane, have a front surface on which a sensor area 530 including an exposed area exposed to the outside through the accommodating portion 119 is formed, and be partitioned into a pad area 510 which is spaced apart from the sensor area 530 and connected to the pad 158 of the circuit board 150 through the connecting member 140, and a connection portion 520 connecting the sensor area 530 and the pad area 510.

In the biosensor chip 500 of FIG. 10, the pad area 510 can be formed such that a source pad 511S, a gate pad 511G, and a drain pad 511D are disposed in a line in a rectangular shaped cross-section, but it is not limited thereto.

The sensor area 530 detects a target material from the contacted specimen, and probe material that reacts with the target material to generate an electrical signal, e.g., an antigen, an antibody, an enzyme, and the like are attached thereto.

When the sensor area 530 comes into contact with a specimen, it interacts with a target material included in the specimen to generate an electrical signal. Accordingly, the external diagnostic device 200 connected to the biosensor 100 can analyze an electrical signal generated from the biosensor 100 to detect the presence or concentration of the target material.

The sensor area 530 includes a transistor structure, and has a structure where probe material is attached to a channel area 550 of the transistor.

When the distal end of the accommodating portion 119 is opened in a circular shape, the sensor area 530 includes an exposed area for a detection reaction in a circle of the distal end of the accommodating portion 119. Thus, the exposed area includes an upper portion 540 of the gate electrode 535G and the channel area 550 for contact with the target material.

Specifically, the sensor area 530 includes a plurality of circular or ring-shaped electrodes 535S, 535D, and 535G forming a concentric circle with respect to the center O of the circular distal end of the accommodating portion 119, and a plurality of channel areas 550 are formed to be spaced apart from each other as shown in FIG. 12 between the plurality of electrodes 535S, 535D, and 535G, particularly, between the source electrode 535S and the drain electrode 535D.

An insulating layer 532 is formed on the semiconductor substrate 531, and the insulating layer 532 can be formed of oxide or nitride. When the semiconductor substrate 531 is a silicon substrate, the insulating layer 532 can be formed of silicon oxide or silicon nitride, and can be formed by various methods. For example, a silicon oxide layer can be formed on the surface through heat treatment.

A plurality of channels 533 are formed on the insulating layer 532 to be spaced apart from each other. A plurality of channels 533 are disposed spaced apart by a certain distance from the center O of the accommodating portion 119 of the sensor area 530, and a central area of each channel 533 is exposed to form the channel area 550.

That is, the plurality of channels 533 are disposed to be spaced apart from each other on the circumference of an imaginary circle having a certain length as a radius in the center O of the circle. For example, the plurality of channels 533 can be arranged similar to spokes on a wheel.

In this situation, the diameter of the circle on which the plurality of channels 533 are disposed can satisfy 1.4 to 1.6 mm, which is a value at the time when it is assumed that the width CW1 of the biosensor chip 500 is 6 mm, and can satisfy about ¼ of the width CW1 of the biosensor chip 500.

The plurality of channels 533 can be disposed to be spaced apart by the same angle $\theta 1$. For example, as shown in FIG. 10, seven channels 533 can be formed, and each channel 533 can be spaced apart at an angle of 45 degrees.

Alternatively, five channels 533 can be disposed so that each channel 533 can be spaced apart at an angle of 60 degrees.

One channel 533 can be patterned in a specific shape, and can be formed of a graphene-based material that is highly reactive as a highly conductive material.

The shape of one channel 533 of FIG. 10 includes an overlapping area 551, 552 overlapping with the source electrode and the drain electrode 535S, 535D, and a path area 553 connecting two overlapping areas 551, 552, and includes a channel area 550 exposed to the outside through the accommodating portion 119 in the path area 553.

When viewed from the expanded channel 533 of FIG. 10, a separation distance WP is formed between the source electrode 535S and the drain electrode 535D, and the channel 533 is disposed to cross the separation distance WP and to form the path area 553.

Accordingly, a source overlapping area 551 overlapping with the source electrode 535S and a drain overlapping area 552 overlapping with the drain electrode 535D have the same shape, and are formed to extend from the path area 553 and have a length greater than the path area 553.

Accordingly, the channel 533 can have a dumbbell shape or letter "I" shape having a larger length in the overlapping areas 551, 552 of the source electrode 535S and the drain electrode 535D, but is not limited thereto.

In this situation, the source overlapping area 551 and the drain overlapping area 552 can include a portion having the same length as the path area 553, and can be patterned with a rectangular shape having the same length as the path area 553.

That is, the channel 533 has a path area 553 extending in the length direction. At both ends of the path area 553, when one end is disposed to form a source overlapping area 551 overlapping with the source electrode 535S, and the other end is disposed to form a drain overlapping area 552 overlapping with the drain electrode 535D, it can be deformed into any shape.

When the separation distance WP between the source electrode 535S and the drain electrode 535D satisfies 70 to 90 µm (e.g., 80 µm), the distance Wn between the extended area of the path area 553 can be designed to have a range of 190 to 220 µm (e.g., 205 µm), and the channel area 550 is located above the separation distance WP, so that a part of the path area 553 of the channel 533 is exposed.

The width Wch of the channel area 550 can be formed to be narrower than the separation distance WP, and can be, for example, 55 to 65 µm (e.g., 50 µm).

In addition, the length Ln of the path area 553 is formed to be longer than the length Lch of the channel area 550. For example, when the length Lch of the channel area 550 is 80 to 100 µm (e.g., 90 µm), the length Ln of the path area 553 can satisfy 105 to 120 µm (e.g., 112.5 µm).

Accordingly, when the channel area 550 is formed by forming a window on the path area 553, it is designed in consideration of the window tolerance so that the channel area 550 does not deviate outside the channel 533. For example, the path area 553 is set to be wider than the channel area 550.

Preferably, the length of the channel area 550 and the path area 553 can be designed in a ratio of about 1:1.2 to 1:1.3.

As described above, when the channel 533 has the channel area 550 open in a rectangular shape of 60*90 µm, since the separation distance WP between the source electrode 535S and the drain electrode 535D satisfies 70 to 90 µm, the channel area 550 is formed on the separation distance WP.

In addition, the path area 553 of the channel 533 can also be patterned to have a rectangular shape of 200*110 µm, but such a numerical value can be variously changed according to design.

The source overlapping area 551 and the drain overlapping area 552 formed at both ends of the path area 553 have the same shape, have a certain width, and are expanded to have a greater length than the path area 553.

In this situation, the length Lw of the expanded overlapping area 551, 552 can be 2 to 2.5 times the length Ln of the path area 553, but is not limited thereto.

For example, when the length Ln of the path area 553 is 110 µm, the length Lw of the overlapping area 551, 552 can satisfy 240 µm.

As described above, the reliability of the connection with the electrode 535S, 535D can be secured by having a larger length in the areas 551, 552 overlapping with the electrodes 535S, 535D, thereby lowering the resistance of the channel area 550.

However, as described above, the channel 533 can be formed in a bar type to have the same width from the overlapping area 551, 552 to the path area 553.

The plurality of channels 533 formed as described above are spaced apart from each other at the same angle while satisfying a diameter of a certain distance from the center O of the accommodating portion 119 and are distributedly disposed.

Meanwhile, one source electrode 535S is formed while overlapping with the source overlapping area 551 of the plurality of channels 533 that are distributedly disposed.

Specifically, the source electrode 535S having the shape of a circle having the smallest diameter can be formed on the center O of the sensor area 530 exposed by the accommodating portion 119. The source electrode 535S can be formed in a circle, and is formed to overlap with the source overlapping area of the channel 533, and simultaneously overlap with the plurality of channels 533 to simultaneously transmit the source voltage to the plurality of channels 533.

The diameter of the source electrode 535S can satisfy 0.9 to 1.1 mm, and preferably, the source electrode 535S can be patterned as a circle having a diameter of 1 mm at the center O of the circle.

When the seven channels 533 are distributedly disposed, the source electrode 535S divides the circle into eight equal parts, and protrudes into a separation space where the channel 533 is not formed, so that a connection portion 521 extends to the source pad 511S.

On the other hand, when five channels 533 are formed, the circle is divided into six equal parts, and a connection portion extends into the separation space where the channel 533 is not formed.

Accordingly, in the source electrode, a circle is divided into equal parts by the sum of the number of channels and the number of connection portions, and the channel and the connection portion are respectively disposed at an equiangular position.

Meanwhile, a drain electrode 535D can be formed on the outer periphery of the channel area 550 to be spaced apart from the source electrode 535S.

The drain electrode 535D can be formed in a ring shape, and is formed along the circumference of an imaginary circle that surrounds the channel area 550 and has a larger diameter than that of the channel area 550.

The diameter of the circle of the drain electrode 535D can be 1.7 mm to 1.8 mm, but is not limited thereto.

The drain electrode 535D also simultaneously overlaps with the drain overlapping areas 552 of the plurality of channels 533 to simultaneously receive current from the plurality of channels 533.

The drain electrode 535D has a ring shape that simultaneously overlaps with the plurality of channels 533 as a whole, but a portion thereof is cut off forming a cut area (e.g., a notched portion). The connection portion 521 of the source electrode 535S passes through the cut area in the notched ring shape of the drain electrode 535D. In other words, when viewed from above in a plan view, the drain electrode 535D and the source electrode 535S can form coupled arrangement similar to a ball and socket joint.

In this situation, an extension portion 521 of the drain electrode 535D that protrudes from a portion of the drain electrode 535D and extends to the outside of the sensor area 530 is further included.

The extension portion 521 of the drain electrode 535D also extends to the outside and is connected to the drain pad 511D.

The extension portion can be formed in a shape surrounding the gate electrode 535G formed outside the drain electrode 535D as shown in FIG. 10, but is not limited thereto. For example, the drain electrode 535D and the gate electrode 535G can form an arrangement similar to two nested letter "C's" with the source electrode 535S disposed at the center.

That is, when the pad area 510 is formed at one distal end as shown in FIG. 10, it can be formed to extend to the drain pad 511D of a corresponding pad area 510, and can be formed in a shape surrounding the gate electrode 535G to be disposed without disconnection of the gate electrode 535G.

In this situation, the separation distance between the gate electrode 535G and the drain electrode 535D can be formed to be narrower than the separation distance between the outer circumference of the gate electrode 535G and the connection portion of the drain electrode 535D, but is not limited thereto and can be formed to have the same separation distance.

Meanwhile, a gate electrode 535G is formed along the circumference of an imaginary circle having a larger diameter surrounding the drain electrode 535D.

The diameter of the circle of the gate electrode 535G can satisfy 3 to 3.8 mm, when it is assumed that the width WC1 of the biosensor chip 500 is 6 mm.

The diameter of the circle of the gate electrode 535G can satisfy ½ to ⅗ of the width WC1 of the biosensor chip 500.

The gate electrode 535G has the largest area and can occupy ⅕ to ¼ or more of the sensor area 530. In particular, it can satisfy half or more of the area exposed by the distal end of the accommodating portion 119.

Thus, when the gate electrode 535G has the largest area and is exposed by the accommodating portion 119, ions in the specimen that are charged by the bias voltage transmitted by the gate electrode 535G increase as the contact area with the specimen increases. Accordingly, the specimen is easily biased, and the reactivity of the channel 533 is improved.

The gate electrode 535G is formed to be spaced apart from the source electrode, the gate electrode 535S, 535D, and the channel area 550.

The gate electrode 535G also forms a passage so that the connection portions 521 of the drain electrode and the source electrode 535S, 535D are connected to the pad 511, and has one end that is disconnected, and has a connection portion 521 of the gate electrode 535G which protrudes from the outer circumferential surface and extend to the gate pad 511G of the pad area 510. For example, the gate electrode 535G can have a letter "C" shape in which both of the connection portions 521 of the source electrode and the drain electrode 535S, 535D can fit into the opening or mouth of the letter "C" shape.

In order to integrate the gate electrode 535G and secure an area, the connection portions 521 of the source electrode and the drain electrode 535S, 535D can be disposed as close to each other as possible.

The electrodes 535S, 535D, and 535G of the sensor area 530 designed as shown in FIG. 10 are formed in the same layer as in FIGS. 11 and 12.

Accordingly, the source electrode, the drain electrode, and the gate electrodes 535S, 535D, and 535G are all formed in the same layer and formed in one process.

For example, the source electrode, the drain electrode, and the gate electrode 535S, 535D, and 535G can be respectively formed by forming an electrode layer (e.g., a metal layer) and simultaneously patterning a corresponding electrode layer.

Thus, a process step can be reduced, and a process time and cost can be reduced by simultaneously forming three electrodes 535S, 535D, and 535G that do not overlap each other.

The metal layer can be formed of at least one of Ni, Zn, Pd, Ag, Cd, Pt, Ga, In, and Au, but is not limited thereto.

A passivation layer 536 is formed on the electrodes 535S, 535D, and 535G.

The passivation layer 536 is formed on the entire biosensor chip 500 to protect the sensor area 530 and the electrodes 535S, 535D, and 535G.

The passivation layer 536 can be formed of a material resistant to moisture, and can be formed of, for example, an oxide layer, a nitride layer, or a carbide layer. In addition, the passivation layer 536 can be applied with a polymer resin, but is not limited thereto.

The passivation layer 536 exposes only the upper portion 551 of the plurality of channel areas 550, the gate electrode 540, and the plurality of pads 511 in the biosensor chip 500, and covers all other areas.

Accordingly, the area exposed by the passivation layer 536 is very limited. In particular, in the sensor area 530, only the gate electrode 535G and the channel area 550 are exposed to induce a reaction by coming into direct contact with the specimen.

In the pad area 510, each pad 511 is exposed in an insulated state, and electrically in contact with each pad 158 of the circuit board 150 through a connecting member 140.

Figure 14A:
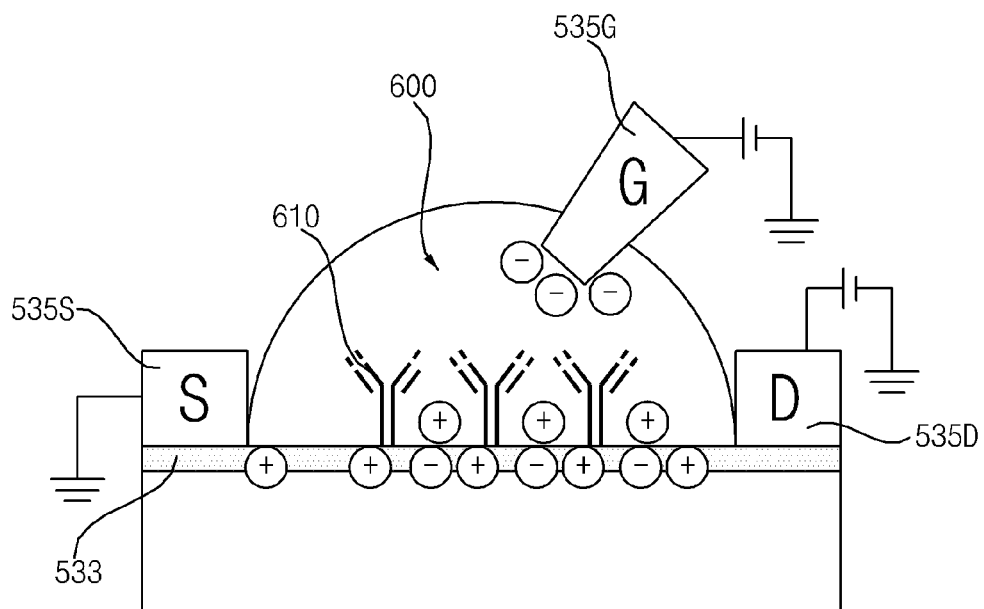
FIGS. 14A and 14B are schematic diagrams illustrating a reaction of the biosensor chip of FIGS. 10 and 13 according to a target material according to an embodiment of the disclosure.

As shown in FIG. 14A, probe material 610 is attached to each of the channel areas 550 exposed as described above to activate the sensor.

The probe material 610 is a material that reacts specifically to a target material to be detected by the sensor. When the target material is an antigen, an antibody can be attached thereto, or when the target material is an antibody, an antigen can be attached thereto.

When the channel 533 is formed of graphene, a linker material can be attached for smooth connection between the probe material 610 and graphene, and a process of attaching the probe material 610 after attaching a linker material on graphene is defined as an activation process.

The linker material is different depending on the material constituting the channel 533 and the probe material 610, and in the situation of graphene, it can be a polymer structure having a nano size, for example, can be formed of at least one of polyurethane, polydimethylsiloxane, Norland Optical Adhesives NOA, epoxy, polyethylene terephthalate, polymethyl methacrylate, polyimide, polystyrene, polyethylene naphtharate, polycarbonate, and combinations thereof.

In addition, the linker material can be formed of a combination of polyurethane and NOA (e.g., NOA 68). However, the linker material is not limited thereto, and can be made of various polymers having flexibility.

Figure 13:
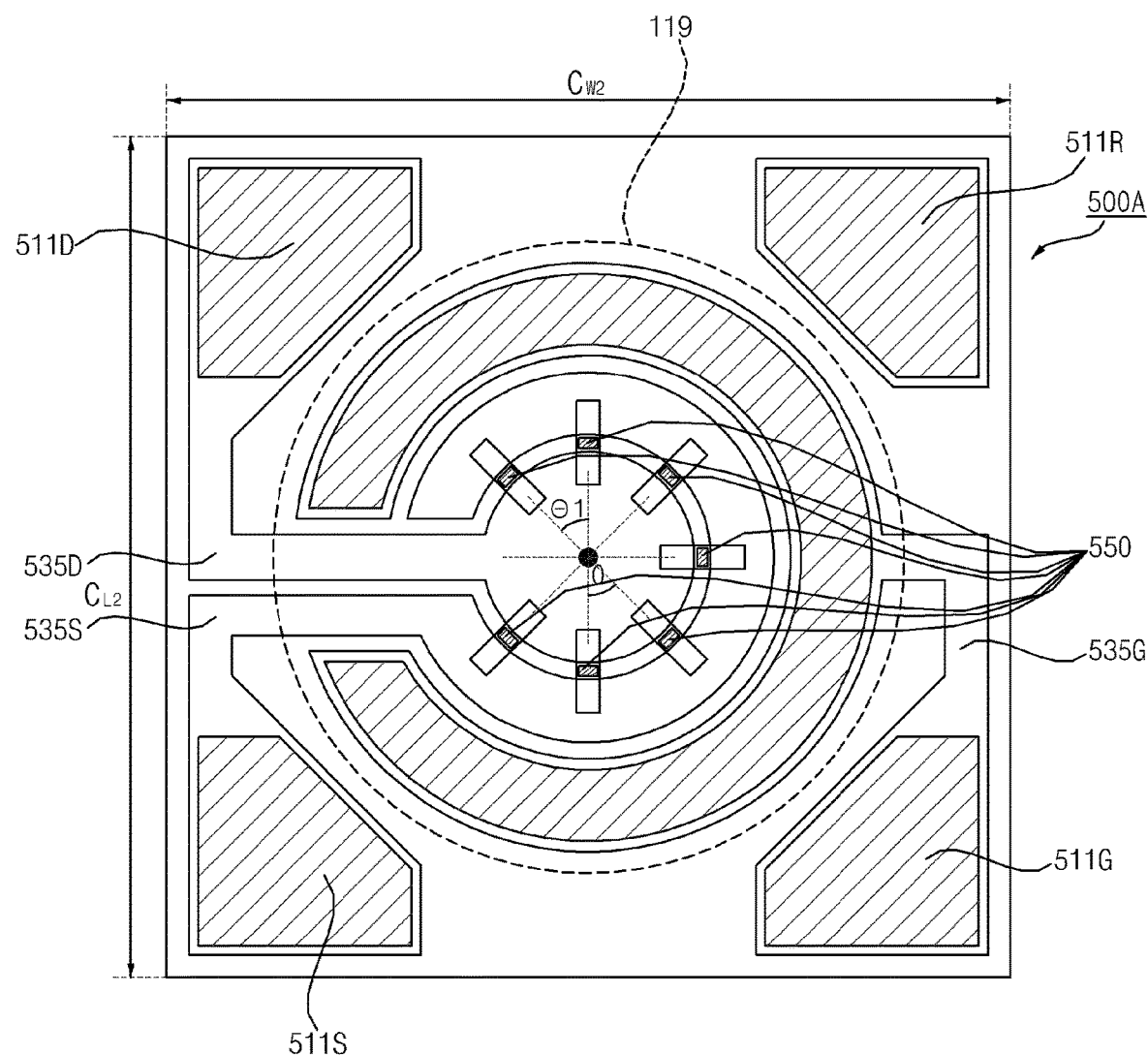
FIG. 13 is a top view of another example of a biosensor chip applicable to the biosensor cartridge of FIGS. 6 to 9 according to an embodiment of the disclosure.

FIG. 13 is a top view of another example of a biosensor chip applicable to the biosensor cartridge of FIGS. 6 to 9.

The biosensor chip 500A of FIG. 13 detects a target material from the specimen introduced into the biosensor chip 500 by the accommodating portion 119 of the biosensor cartridge 100 like the biosensor chip 500 of FIG. 10, and transmits an electrical signal generated by reacting with the detected target material to the pad 158 of the circuit board 150 through the electrode pad 511.

For example, the specimen is a biological material, and can refer to saliva, a body fluid including sweat, blood, a solution diluted with serum or plasma, and the like.

The biosensor chip 500A is a semiconductor-based biosensor chip 500, and can be manufactured as a biosensor chip 500A to which graphene is applied.

The biosensor chip 500A can have various sizes depending on the type of target material, the number of target materials, and the size of the cartridge 100, and unlike FIG. 10, can have a square shape having the same chip width CW2 and chip length CL2.

As described above, when the biosensor chip 500A has a square shape, the chip width CW2 and the chip length CL2 can satisfy about 6 mm, and preferably can be formed in a size of 5.7 to 6.3 mm, more preferably in a size of 6*6 mm.

As shown in FIGS. 10 to 12, the biosensor chip 500A of FIG. 13 has a sensor area 530, which includes an exposed area exposed to the outside through the accommodating portion 119, that is formed on the front surface, and can be partitioned into the pad area 510 which is spaced apart from the sensor area 530 and connected to the pad 158 of the circuit board 150 through the connecting member 140, and the connection portion 520 connecting the sensor area 530 and the pad area 510.

The biosensor chip 500A of FIG. 13 can have an electrode pattern aligned with the accommodating portion 119 such that the sensor area 530 is disposed in the central area of the square shape, and a pad can be formed in each corner area while surrounding such a sensor area 530.

Accordingly, the source pad 511S, the gate pad 511G, and the drain pad 511D can be disposed in each corner area, and a dummy pad 511R can be further formed in a remaining corner area. Such a pad 511R can be utilized later when the connecting member 140 for connection with the circuit board 150 is attached.

Probe material, such as an antigen, an antibody, and an enzyme, that detect a target material from the contacted target specimen and react with the target material to generate an electrical signal is attached to the sensor area 530.

When the sensor area 530 comes into contact with the specimen, it interacts with the target material included in the specimen to generate an electrical signal. Accordingly, the external diagnostic device 200 connected to the biosensor 100 can analyze an electrical signal generated from the biosensor 100 to detect the presence or concentration of the target material.

The sensor area 530 includes a transistor structure, and has a structure where probe material is attached to a channel area 550 of the transistor. For example, the sensor area 530 forms a type of switch that is switched on in the presence of the target material.

When the distal end of the accommodating portion 119 is opened in a circular shape, the sensor area 530 includes an exposed area for a detection reaction in a circle by opening by the distal end of the accommodating portion 119, and the exposed area includes the channel area 550 and an upper portion 540 of the gate electrode 535G for contact with the target material.

The open area of the distal end of the accommodating portion 119 is disposed in the central area of the biosensor chip 500A.

Accordingly, the center O of the sensor area 530 can be the center O of the biosensor chip 500A.

The center O of the sensor area 530 overlaps with the center O of the circular distal end of the accommodating portion 119, and a plurality of circular or ring-shaped electrodes 535S, 535D, and 535G forming a concentric circle with respect to the center O are included. A plurality of channel areas 550 are formed to be spaced apart from each other as shown in FIG. 13, between the plurality of electrodes 535S, 535D, and 535G, in particular, between the source electrode 535S and the drain electrode 535D.

In this situation, the interlayer stacking structure of the biosensor chip 500A is the same as that of FIGS. 11 and 12. That is, an insulating layer 532 is formed on the semiconductor substrate 531, and each electrode and pad are formed in a pattern of a channel on the insulating layer and a metal layer on the channel. At this time, it also has the same process of forming the passivation layer that covers the whole while exposing a part of the exposed area, and since the material of each layer is the same as described in FIGS. 10 to 12, a description thereof is omitted.

The plurality of channels 533 are spaced apart from the center O of the accommodating portion 119 of the sensor area 530 by a certain distance, and the center area of each channel 533 is exposed to from the channel area 550.

That is, the plurality of channels 533 are disposed to be spaced apart from each other on the circumference of an imaginary circle having a certain length as a radius in the center O of the circle.

At this time, the diameter of the circle on which the plurality of channels 533 are disposed can satisfy 1.4 to 1.6 mm (e.g., 1.5 mm), which is a value when it is assumed that the width CW2 of the biosensor chip 500A is 6 mm, and can satisfy about ¼ of the width CW2 of the biosensor chip 500A.

The plurality of channels 533 can be disposed to be spaced apart by the same angle θ1. For example, as shown in FIG. 13, seven channels 533 can be formed, and each channel 533 can be spaced apart at an angle of 45 degrees. Alternatively, five channels 533 can be disposed so that each channel 533 can be spaced apart at an angle of 60 degrees. One channel 533 can be patterned in a specific shape, and can be formed of a graphene-based material that is highly reactive as a highly conductive material.

The shape of one channel 533 of FIG. 13 includes an overlapping area overlapping with the source electrode and the drain electrode 535S, 535D, and a path area connecting two overlapping areas, and includes a channel area 550 exposed to the outside through the accommodating portion 119 in the path area 553.

Each channel 533 in FIG. 13 can be formed in a bar type unlike FIG. 10, and the source overlapping area and the drain overlapping area can have the same length as the path area. For example, each of the channels 533 can be arranged around a circle, similar to spokes on a wheel.

That is, the channel 533 has a path area extending in the length direction. At both ends of the path area, when one end is disposed to form a source overlapping area overlapping with the source electrode 535S, and the other end is disposed to form a drain overlapping area overlapping with the drain electrode 535D, it can be deformed into any shape.

When a separation distance WP between the source electrode and the drain electrode 535S, 535D satisfies 70 to 90 μm (e.g., 80 μm), the width of the channel area 550 can be formed to be narrower than the above separation distance, and can be, for example, 55 to 65 μm (e.g., 60 μm).

Accordingly, when the channel area 550 is formed by forming a window on the path area, the channel area 550 is designed in consideration of the window tolerance so as not to deviate outside the channel.

As described above, when the channel 533 has the channel area 550 that is opened in a rectangular shape of 60*90 μm, the separation distance between the source electrode and the drain electrode 535S and 535D can satisfy 70 to 90 μm (e.g., 80 μm), so that the channel area 550 is formed above the separation distance.

In addition, the entire width of the channel 533 has a width of 380 to 420 μm (e.g., 400 μm), and can be patterned to have a rectangular shape having a length of 110 μm, but such a numerical value can be variously changed according to a design.

The source overlapping area and the drain overlapping area formed in both ends of the path area have the same shape, and the area overlapping with each electrode 535S, 535D has a larger length than the path area, so that reliability of connection with the electrode 535S, 535D can be secured and the resistance of the channel area 550 can be reduced.

The plurality of channels 533 formed as described above are distributedly disposed and spaced apart from each other at the same angle along the circumference of an imaginary circle on which the channels 533 are disposed.

Meanwhile, one drain electrode 535D is formed while overlapping with the drain overlapping area of the plurality of channels 533 that are distributedly disposed.

Specifically, the drain electrode 535D having the shape of a circle having the smallest diameter can be formed on the center O of the circle of the sensor area 530. The drain electrode 535D can be formed as a circle having the smallest diameter, be formed to overlap with the drain overlapping area of the channel 533, and simultaneously overlap with the plurality of channels 533 to provide a drain current to the plurality of channels 533.

A diameter of the drain electrode 535D can satisfy 0.9 to 1.1 mm, and preferably, can be patterned as a circle having a diameter of 1 mm at the center of the circle.

When the seven channels 533 are distributedly disposed, the drain electrode 535D divides the circle into eight equal parts, and protrudes into a separation space where the channel 533 is not formed, so that a connection portion 521 extends to the drain pad 511D.

On the other hand, when five channels 533 are formed, the circle is divided into six equal parts, and a connection portion extends into the separation space where the channel 533 is not formed.

Accordingly, in the drain electrode 535D, a circle is divided into equal parts by the sum of the number of channels and the number of connection portions, and the channel 533 and the connection portion are respectively disposed at an equiangular position.

Meanwhile, a source electrode 535S can be formed on the outer periphery of the channel area 550 to be spaced apart from the drain electrode 535D.

The source electrode 535S can be formed in a ring shape, and is formed along the circumference of an imaginary circle that surrounds the channel area 550 and has a larger diameter than that of the channel area 550.

The diameter of the circle of the source electrode 535S can be 1.7 mm to 1.8 mm, but is not limited thereto.

The source electrode 535S also simultaneously overlaps with the source overlapping area of the plurality of channels 533 to transmit a source voltage to the plurality of channels 533.

The source electrode 535S has a ring shape that simultaneously overlaps with the plurality of channels 533 as a whole, but a portion thereof is cut off to form a cut area (e.g., similar to the shape of the letter "C"). The connection portion 521 of the source electrode 535S passes through the cut area (e.g., through the opening or mouth of the letter "C").

In this situation, an extension portion that protrudes from a portion of the source electrode 535S and extends to the outside of the sensor area is further included.

The extension portion of the source electrode 535S also extends to the outside and is connected to the source pad 511S.

The extension portion of the drain electrode 535D and the source electrode 535S extends to the outside of the sensor area as shown in FIG. 13, and is connected to each of the drain pad 511D and the source pad 511S disposed in the upper corner area and the lower corner area.

Meanwhile, a gate electrode 535G is formed along the circumference of an imaginary circle having a larger diameter surrounding the source electrode 535S.

The diameter of the circle of the gate electrode 535G can satisfy 3 to 3.9 mm (e.g., 3.45 mm), when it is assumed that the width of the biosensor chip 500A is 6 mm.

The diameter of the circle of the gate electrode 535G can satisfy ½ to ⅗ of the width of the biosensor chip 500A.

The gate electrode 535G has the largest area and can occupy ⅕ to ¼ or more of the biosensor chip 500A. In particular, half or more of the open area exposed by the distal end of the accommodating portion 119 can be satisfied.

As described above, when the gate electrode 535G has the largest area and is exposed by the accommodating portion 119, as the contact area with the specimen increases, ions in the specimen that are charged by the bias voltage transmitted by the gate electrode 535G increase. Accordingly, the specimen is easily biased, thereby improving the reactivity of the channel 533.

The gate electrode 535G is formed to be spaced apart from the source electrode, the gate electrode 535S and 535D, and the channel area 550.

The gate electrode 535G also forms a passage so that the connection portion 521 of the drain electrode and the source electrode 535S, 535D is connected to the pad 511, and has one end that is disconnected, and has a connection portion 521 of the gate electrode 535G which protrudes from the outer circumferential surface and extend to the gate pad 511G.

In order to integrate the gate electrode 535G and secure an area, the connection portion of the source electrode 535S and the drain electrode 535D can be disposed as close to each other as possible.

Thus, a process step can be reduced, and a process time and cost can be reduced by simultaneously forming the three electrodes 535S, 535D, and 535G that do not overlap each other. For example, the three electrodes 535S, 535D, and 535G can be formed or patterned from a same metal layer.

The metal layer can be formed of at least one of Ni, Zn, Pd, Ag, Cd, Pt, Ga, In, and Au, but is not limited thereto.

A passivation layer 536 is formed on the electrode 535S, 535D, and 535G, and exposes only a plurality of channel areas 550, the gate electrode 540, and a plurality of pads 511 in the biosensor chip 500A, 500, and covers all other area. Only the gate electrode 535G and the channel areas 550 are exposed in the sensor area 530 to induce a reaction by directly contacting the specimen.

Each pad 511 formed in the corner area is exposed in an insulated state from each other, and electrically in contact with each pad 158 of the circuit board 150 through a connecting member 140.

As shown in FIG. 14A, probe material 610 is attached to each of the channel areas 550 exposed as described above to activate the sensor.

The probe material 610 is a material that reacts specifically to a target material to be detected by the sensor. When the target material is an antigen, an antibody can be attached thereto, or when the target material is an antibody, an antigen can be attached thereto.

When the channel 533 is formed of graphene, a linker material can be attached for smooth connection between the probe material 610 and graphene, and a process of attaching the probe material 610 after attaching a linker material on graphene is defined as an activation process.

The linker material is different depending on the material constituting the channel 533 and the probe material 610, and in the situation of graphene, it can be a polymer structure having a nano size, for example, can be formed of at least one of polyurethane, polydimethylsiloxane, Norland Optical Adhesives NOA, epoxy, polyethylene terephthalate, polymethyl methacrylate, polyimide, polystyrene, polyethylene naphtharate, polycarbonate, and combinations thereof.

In addition, the linker material can be formed of a combination of polyurethane and NOA (e.g. NOA 68).

However, the linker material is not limited thereto, and can be made of various polymers having flexibility.

Figure 14B:
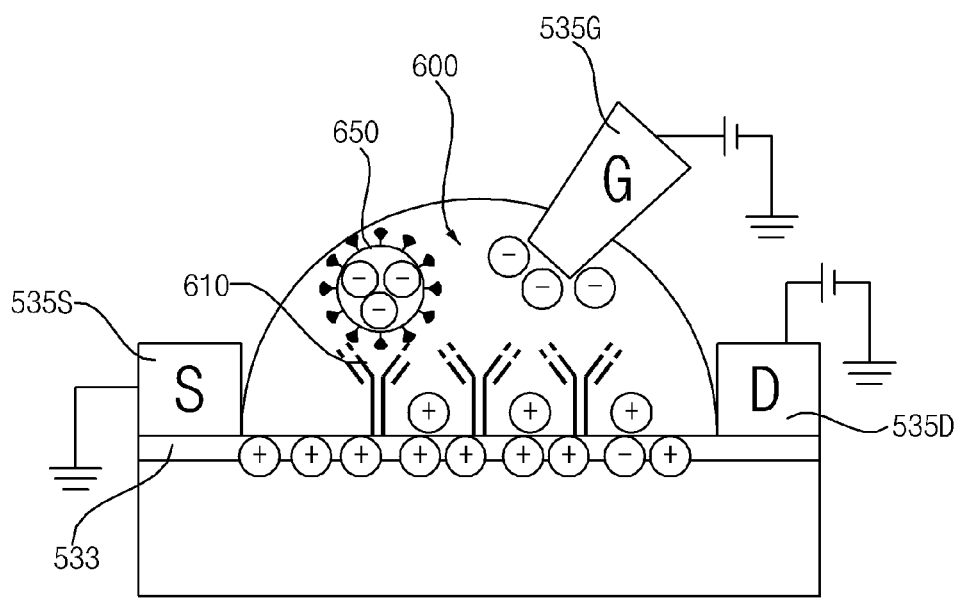
Figure 15:
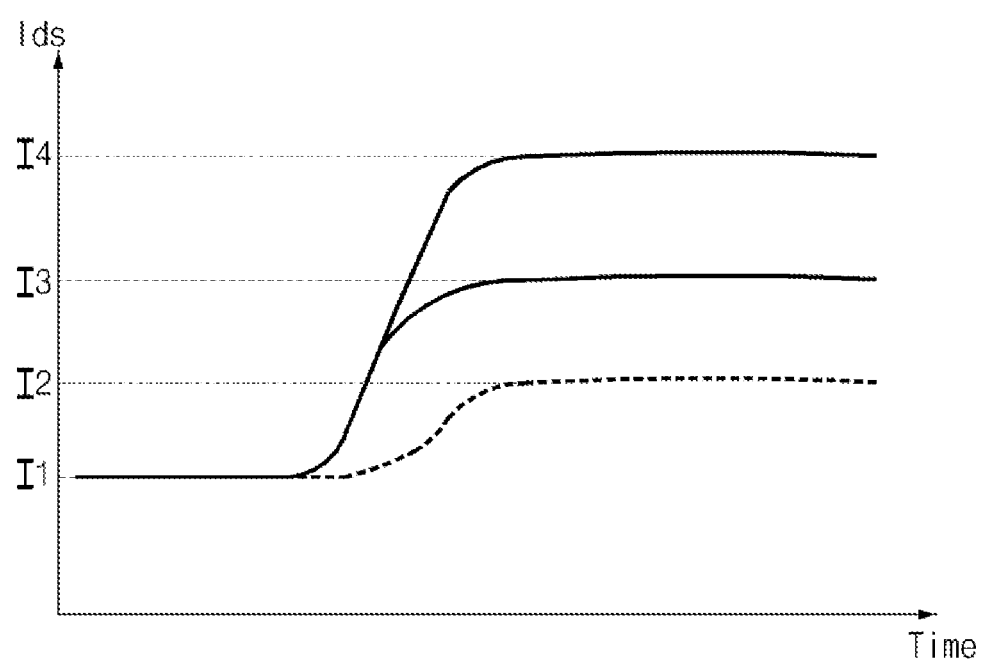
FIG. 15 is a graph illustrating a change in output current of the biosensor chip according to FIGS. 14A and 14B according to an embodiment of the disclosure.

FIGS. 14A and 14B are schematic diagrams illustrating a reaction of the biosensor chip of FIGS. 10 and 13 according to a target material, and FIG. 15 is a graph illustrating a change in output current of the biosensor chip according to FIGS. 14A and 14B.

An electrical detection signal according to a reaction of the biosensor chip 500 can be described with reference to FIGS. 14A and 14B. When the target material does not exist in the specimen as shown in FIG. 14A, the source electrode 535S receives a source voltage and the gate electrode 535G receives a gate voltage by the voltage applied to each pad 511.

The gate electrode 535G is exposed to the accommodating portion 119 and comes into contact with the specimen provided from the outside to apply a bias voltage to the specimen. Therefore, the specimen exists in a state of being partially charged with respect to the voltage of the gate electrode 535G.

At this time, the drain current Ids read from the drain electrode 535D is as shown in FIG. 15. That is, when there is no target material reacting with the probe material 610 in the specimen 600, the drain current Ids has a first value I1, which is defined as a reference current.

At this time, as shown in FIG. 14B, when the target material 650 exists in the specimen 600, the channel 533 is charged with a specific carrier as the target material 650 reacts with the probe material 610. For example, as shown in FIG. 14B, a depletion state in which charges are accumulated in the channel 533 can proceed.

Accordingly, as the drain current Ids read from the drain electrode 535D increases, it has a second value I2 of FIG. 15.

At this time, the amount of accumulated charge is proportional to the area of the channel 533. Thus, when the number of channels 533 is one, the drain current Ids has a second value I2. When the number of channels 533 is two or more, the drain current Ids has a third value I3 greater than the second value I2. When the number of channels 533 is three or more, the drain current Ids has a fourth value I4 greater than the third value I2. Accordingly, the value of the drain current Ids read from the drain electrode 535D is amplified.

At this time, even when one channel 533 does not operate as the plurality of channels 533 are spaced apart from each other, the existence of the target material can be recognized by causing the drain current Ids to increase or decrease in another channel 533.

As described above, the graphene channel biosensor chip 500 has a multi-channel structure having a plurality of channels spaced apart from each other, thereby amplifying a drain current and compensating for a malfunctioning channel.

In such a biosensor chip 500, both the gate electrode 535G and the channel area 550 can be exposed by the distal end opening of the accommodating portion 119 having a circle larger than the circumference of the gate electrode 535G.

In addition, the plurality of channel areas 550 are formed to be spaced apart at the same angle and at the same distance from the center O of the sensor area 530 opened by the accommodating portion 119 such that the specimen is uniformly contacted, and formed in a shape surrounding the source and drain electrodes 535S and 535D in order to dispose the channel 533 between the source and drain electrodes 535S and 535D, thereby optimizing a structure.

The design of the biosensor chip 500 can be variously changed as long as the transistor in which the gate electrode 535G and the plurality of channels 533 are exposed is maintained in the accommodating portion 119.

Accordingly, the position of the pad 511 can also be variously changed. However, the positions of the connecting member 140 and the connection pad 158 of the circuit board 150 are also changed according to the change in the position of the pad 511.

Meanwhile, the biosensor chip 500 including the plurality of channels 533 spaced apart from each other can be designed to detect different target materials.

Hereinafter, a structure of a biosensor chip for a multi-target will be described with reference to FIGS. 16 to 20.

Figure 16:
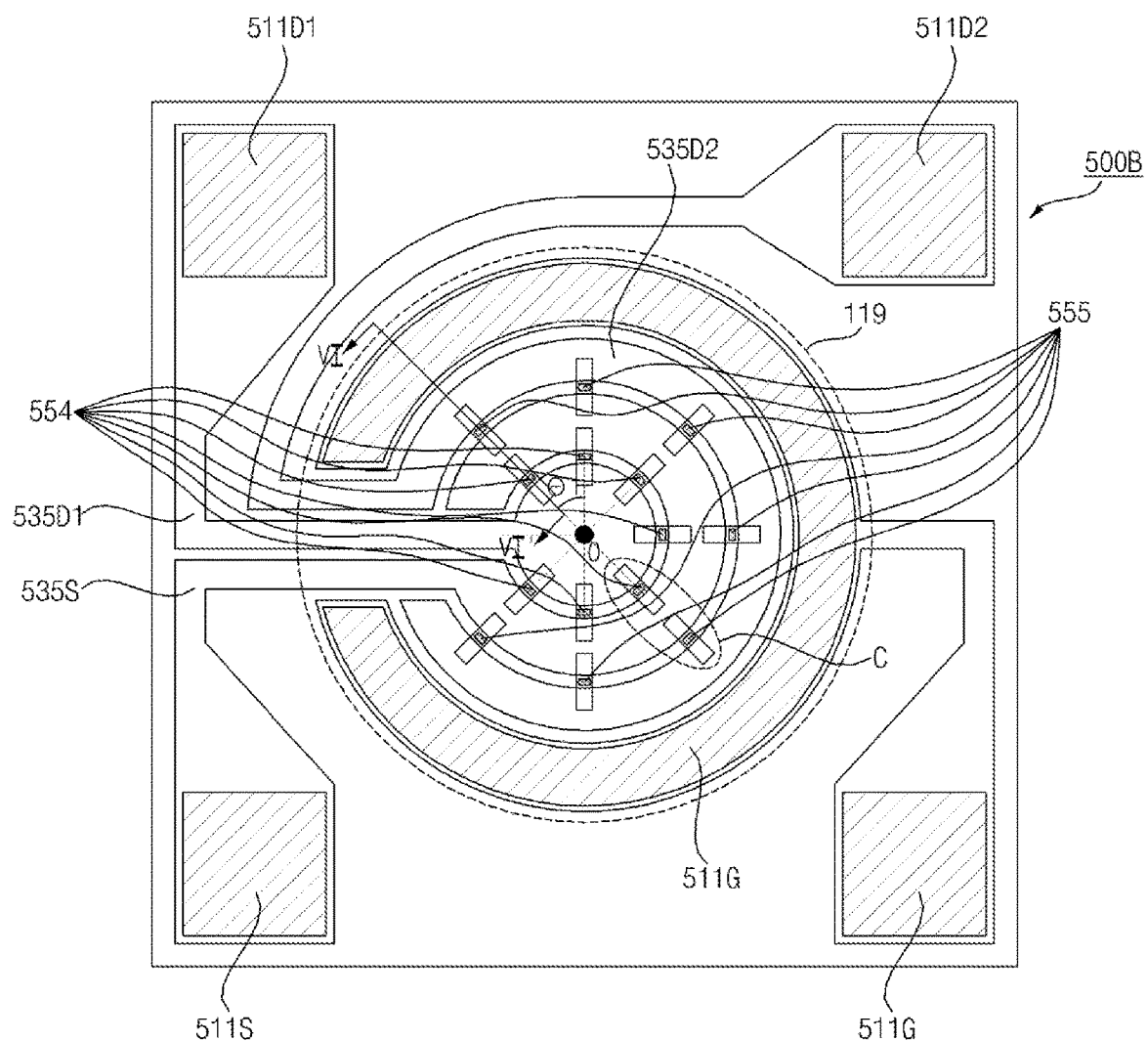
FIG. 16 is a top view of another example of a biosensor chip applicable to the biosensor cartridge of FIGS. 6 to 9 according to an embodiment of the disclosure.
Figure 17:
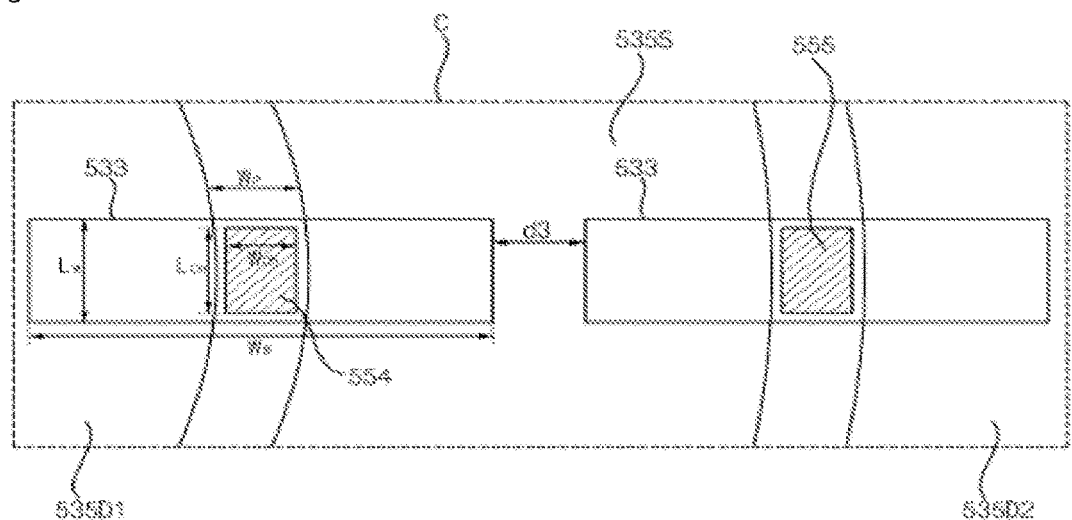
FIG. 17 is an enlarged view of area C of FIG. 16 according to an embodiment of the disclosure.
Figure 18:
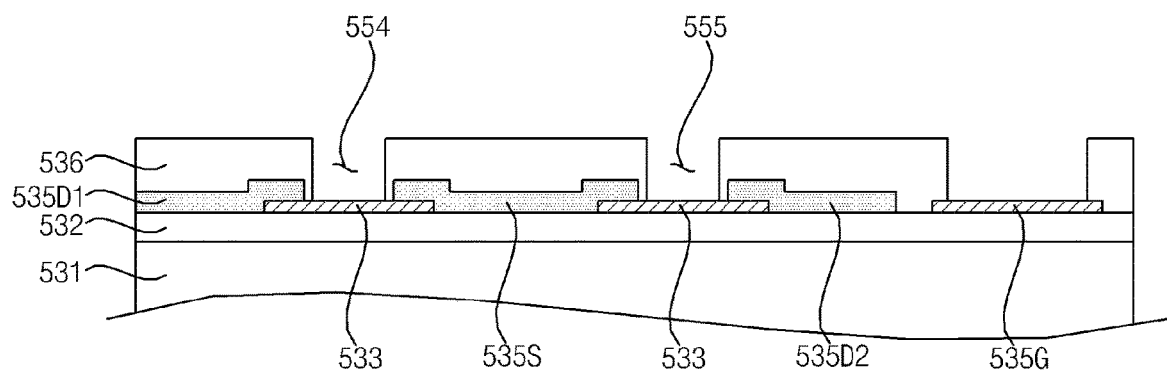
FIG. 18 is a cross-sectional view taken along line VI-VI' of FIG. 16 according to an embodiment of the disclosure.
Figure 19:
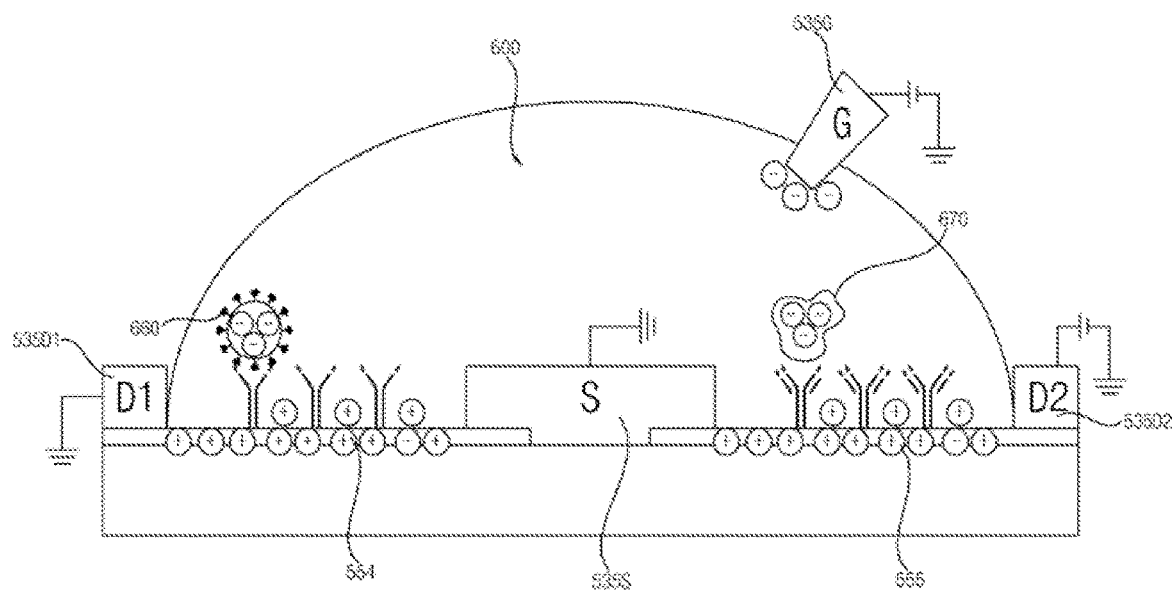
FIG. 19 is a schematic diagram illustrating a reaction of a multi-target biosensor chip of FIG. 16 to multi-target materials according to an embodiment of the disclosure.
Figure 20A:
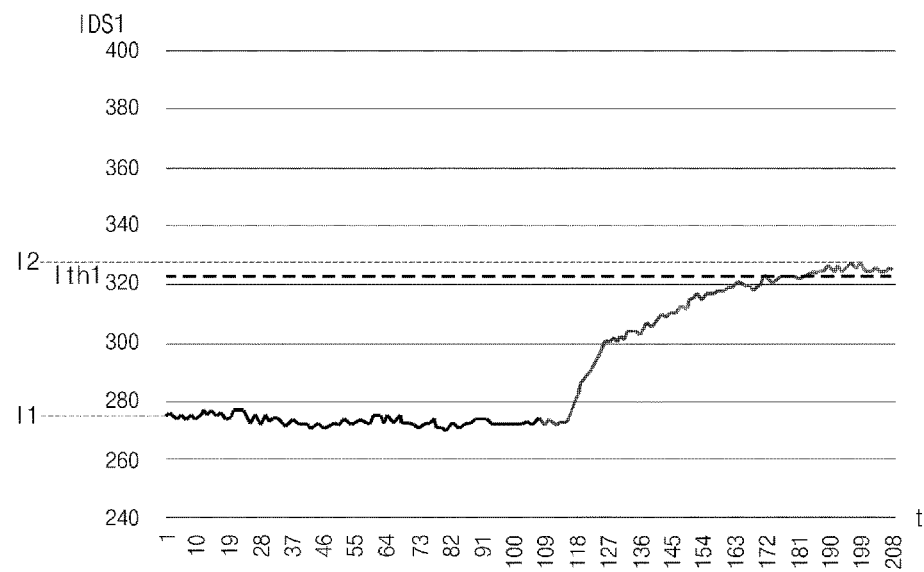
FIG. 20A is a graph illustrating a change in output current with respect to a first target material.
Figure 20B:
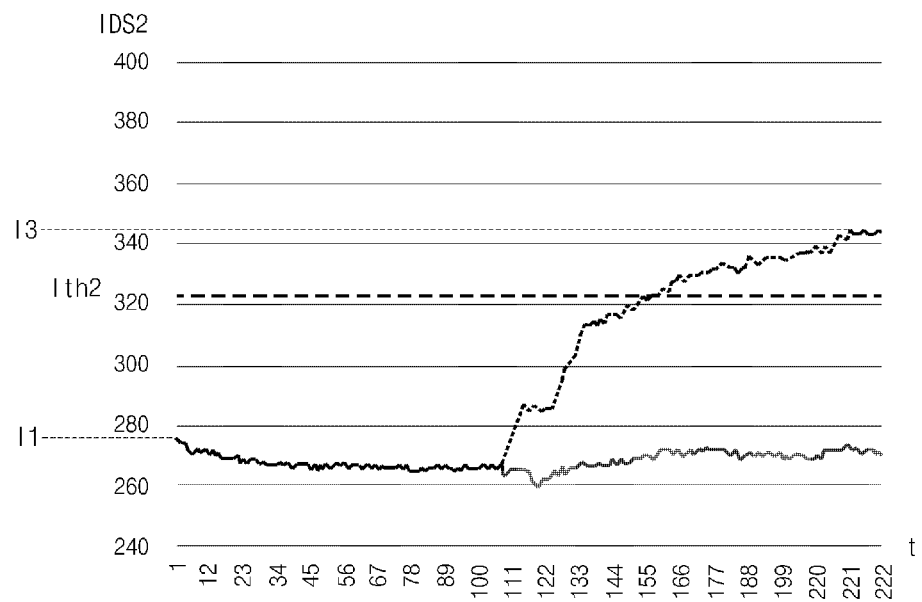
FIG. 20B is a graph illustrating a change in output current of a biosensor chip with respect to a second target material according to an embodiment of the disclosure.

FIG. 16 is a top view of another example of a biosensor chip applicable to the biosensor cartridge of FIGS. 6 to 9, FIG. 17 is an enlarged view of area C of FIG. 16, FIG. 18 is a cross-sectional view taken along line VI-VI' of FIG. 16, FIG. 19 is a schematic diagram illustrating a reaction of a multi-target biosensor chip of FIG. 16 to multi-target materials, FIG. 20A is a graph illustrating a change in output current with respect to a first target material, and FIG. 20B is a graph illustrating a change in output current of a biosensor chip with respect to a second target material.

The multi-target biosensor chip 500B of FIG. 16 detects a plurality of target materials from the specimen introduced into the interior by the accommodating portion 119 of the biosensor cartridge 100 like the biosensor chip of FIG. 13, and transmits an electrical signal generated by reacting with the detected target material to the pad 158 of the circuit board 150 through the electrode pad 511.

For example, the specimen can refer to saliva, a body fluid including sweat, blood, a solution diluted with serum or plasma, and the like, as a biological material.

The biosensor chip 500B is a semiconductor-based biosensor chip 500B, and can be manufactured as a biosensor chip 500B to which graphene is applied.

The biosensor chip 500B can have various sizes depending on the type of target material, the number of target materials, and the size of the cartridge 100, and as shown in FIG. 16, a chip width and a chip length can have the same square shape.

As described above, when the biosensor chip 500B has a square shape, the chip width and length can satisfy about 6 mm, preferably the chip width and length can satisfy 5.7 to 6.3 mm, and more preferably can be formed in the size of 6*6 mm.

As shown in FIG. 16, the multi-target biosensor chip 500B of FIG. 16 has a sensor area 530, which includes an exposed area exposed to the outside through the accommodating portion 119, that is exposed on the front surface, and can be partitioned into the electrode pad 511S, 511D1, 511D2, 511G which are spaced apart from the sensor area 530 and connected to the pad 158 of the circuit board 150 through the connecting member 140, and the connection portion connecting the sensor area 530 and the electrode pad 511S, 511D1, 511D2, 511G.

In the multi-target biosensor chip 500B of FIG. 16, an electrode pattern aligning with the accommodating portion 119 can be formed so that the sensor area 530 is disposed in the central area of a square shape, and the electrode pads 511S, 511D1, 511D2, and 511G can be formed in each corner area while surrounding the sensor area 530.

Accordingly, a source pad, a gate pad, and a first drain pad 511S, 511G, 511D1 can be disposed in each of three corner areas, and a second drain pad 511D2 can be further formed in the remaining fourth corner area.

Probe material, such as an antigen, an antibody, and an enzyme, that detect a target material from the contacted specimen and react with the target material to generate an electrical signal is attached to the sensor area 530.

The external diagnostic device 200 connected to the biosensor 100 can analyze an electrical signal generated from the biosensor 100 to detect the presence or concentration of the target material.

In this situation, the multi-target biosensor chip 500B includes a plurality of channel groups 554 and 555 for detecting a plurality of target materials inside one sensor area 530.

Each of the channel groups 554 and 555 is attached with probe material for detecting the same target material, a plurality of channels 533 of one channel group 554 are connected to the same source and drain electrodes 535S and 535D1 to form one transistor, and a plurality of channels 533 of other channel group 555 are connected to the same source and drain electrodes 535S and 535D2 to form another one transistor.

In this situation, since the source electrode 535S is commonly receivable, it can be implemented as one source electrode with respect to the plurality of channel groups 554 and 555.

In each of the channel groups 554 and 555, probe material corresponding to a relevant target material is attached to the channel area 550.

The sensor area 530 is opened by the distal end of the accommodating portion 119, and includes an upper portion 540 of the gate electrode 535G for contact with the target material and an exposed area in which the channel area 550 is opened.

The sensor area 530 is disposed in a central area of the biosensor chip 500B.

Accordingly, the center O of the sensor area 530 can be the center O of the biosensor chip 500B.

The sensor area 530 includes a plurality of electrodes 535S, 535D1, 535D2, 535G of a circular or ring shape forming a concentric circle with respect to the center O of the circular opening at the distal end of the accommodating portion 119, and a first channel group 554 and a second channel group 555 are formed spaced apart from each other as shown in FIG. 16, between the plurality of electrodes 535S, 535D1, 535D2, and 535G, in particular, between the source electrode 535S and the drain electrode 535D1, 535D2. For example, the first channel group 554 and the second channel group 555 can be arranged in two concentric rings, in which the first channel group 554 is disposed inside of the second channel group 555.

Each of the channel groups 554 and 555 is formed with a plurality of channel areas spaced apart from each other. In this situation, the interlayer stacking structure of the biosensor chip 500B is the same as that of FIGS. 11 and 12. That is, it has a structure in which each electrode and pad are formed in a pattern of forming an insulating layer 532 on the semiconductor substrate 531, forming channel 533 on the insulating layer, and forming a metal layer on the channel 533 (e.g., 633 in FIG. 17).

In this situation, it has the same process as the process of forming a passivation layer covering the entire sensor area 530 while exposing a part thereof, and since the material of each layer is the same as described in FIGS. 10 to 12, a description thereof is omitted.

The plurality of channels 533 of the first channel group and the second channel group 554 and 555 are disposed to be spaced apart by a certain distance from the center O of the circle of the accommodating portion 119 of the sensor area 530, and a central area of each channel 533 is exposed to form a channel area.

That is, the plurality of channels 533 are spaced apart from each other on an imaginary circumference having a certain length as a radius from the center O of the circle, and the diameter of the first channel group 554 and the diameter of the second channel group 555 are different from each other (e.g., arranged in two concentric rings or two concentric circles).

At this time, the diameter of a circumference on which the plurality of channels 533 of the first channel group 554 are disposed can satisfy 0.9 to 1.1 mm, which is a value when it is assumed that the width of the biosensor chip 500B is 6 mm, and can satisfy about ⅙ of the width of the biosensor chip 500B.

The diameter of a circumference on which the plurality of channels 533 of the second channel group 555 are disposed can satisfy 1.8 to 2.1 mm, which is a value when it is assumed that the width of the biosensor chip 500B is 6 mm, and can satisfy about ⅓ of the width of the biosensor chip 500B.

In each channel group 554, 555, the plurality of channels 533 can be disposed to be spaced apart by the same angle, for example, as shown in FIG. 16, seven channels 533 can be formed, and each channel 533 can be spaced apart at an angle of 45 degrees. Alternatively, five channels 533 can be disposed so that each channel 533 is spaced apart at an angle of 60 degrees.

Accordingly, each channel 533 of the first channel group and the second channel group 554 and 555 can be disposed at the same angle.

One channel 533 can be patterned in a specific shape, and can be formed of a graphene-based material that is highly reactive as a highly conductive material.

The shape of one channel 533 of FIG. 16 includes an overlapping area overlapping with the source electrode and the drain electrode 535S, 535D, and a path area connecting two overlapping areas, and includes a channel area exposed to the outside through the accommodating portion 119 in the path area.

Each channel 533 in FIG. 17 can be formed in a bar type in the same manner as in FIG. 13 or a dumbbell shape has in FIG. 10.

That is, the channel 533 has a path area extending in the length direction. At both ends of the path area, when one end is disposed to form a source overlapping area overlapping with the source electrode 535S, and the other end is disposed to form a drain overlapping area overlapping with the drain electrode 535D1, 535D2, it can be deformed into any shape.

At this time, two channels 533 on the radius having the same angle in the first channel group 554 and the second channel group 555 are spaced apart from each other under the source electrode 535S and overlap with one source electrode 535S respectively. At this time, the separation distance d3 between the two channels 533 can satisfy 70 to 90 µm, and preferably can be 80 µm.

When the separation distance Wp between the source electrode 535S and the drain electrode 535D1 in one channel 533 satisfies 70 to 90 µm (e.g., 80 µm), the width Wch of the exposed channel area can be formed to be narrower than the separation distance Wp, and can be, for example, 55 to 65 µm (e.g., 60 µm).

Accordingly, when the channel area is formed by forming a window on the path area, it is designed in consideration of the window tolerance so that the channel area does not deviate outside the channel 533.

As described above, when the channel 533 has a channel area opened in a rectangular shape of 60*90 µm, the separation distance Wp between the source electrode 535S and the drain electrode 535D1 satisfies 70 to 90 µm (e.g., 80 µm) so that a channel area is formed on the separation distance Wp.

In addition, the overall width WW of the channel 533 has a width of 380 to 420 µm (e.g., 400 µm), and can be patterned to have a rectangular shape having a length LW of 110 µm, but such a numerical value can be variously changed depending on a design.

The plurality of channels 533 formed as described above are spaced apart at the same angle along the circumference of an imaginary circle and distributed.

Meanwhile, one first drain electrode 535D1 is formed while overlapping with the drain overlapping area of the plurality of channels 533 of the distributed first channel group 554.

In detail, a first drain electrode 535D1 having the shape of a circle having the smallest diameter can be formed on the center O of the circle of the sensor area 530. The first drain electrode 535D1 can be formed as a circle having the smallest diameter, be formed to overlap with the drain overlapping area of the channel 533, and overlap with the plurality of channels 533 simultaneously to flow a drain current of the plurality of channels 533 of the first channel group 554.

A diameter of the first drain electrode 535D1 can satisfy 0.9 to 1.1 mm, and preferably, can be patterned as a circle having a diameter of 1 mm from the center O of the circle. For example, the first drain electrode 535D1 can have a dot shape, and each of the common source electrode 535S, the second drain electrode 535D2 and the gate electrode 511G can have concentric ring shapes similar to an arrangement of nested letter "C's".

When seven channels 533 are distributedly disposed, the first drain electrode 535D1 divides the circle into eight equal parts and protrudes into a separation space where the channel 533 is not formed, so that the connection portion is extended to the first drain pad 511D1.

On the other hand, when five channels 533 are formed, the circle is divided into six equal parts, and the connection portion is extended to a space where the channel 533 is not formed.

Accordingly, in the first drain electrode 535D1, the channel 533 and the connection portion are respectively disposed at an equiangular position by dividing a circle by the sum of the number of the channels 533 and the number of the connection portion.

Meanwhile, a common source electrode 535S can be formed on the outer periphery of the channel area 550 of the first channel group 554 to be spaced apart from the first drain electrode 535D1.

The common source electrode 535S can be formed in a ring shape, and is formed along the circumference of an imaginary circle that surrounds the first channel group 554 and has a larger diameter than the channel area of the first channel group 554.

The diameter of the circle of the common source electrode 535S can be 1.7 to 2.1 mm, and preferably can satisfy 1.96 mm, but is not limited thereto.

The common source electrode 535S also overlaps with the source overlapping area of the plurality of channels 533 of the first channel group 554 to transmit source voltage to the plurality of channels 533.

The common source electrode 535S has a ring shape that overlaps simultaneously with the plurality of channels 533 as a whole, but a portion thereof is cut to form a cut area. A connection portion of the first drain electrode 535D1 passes through the cut area of the source electrode 535S.

Meanwhile, a second drain electrode 535D2 can be formed on the outer periphery of the channel area of the second channel group 555 to be spaced apart from the common source electrode 535S.

The second drain electrode 535D2 can be formed in a ring shape, and formed along the circumference of an imaginary circle that surrounds the channel area of the second channel group 555 and has a larger diameter than the channel area.

The diameter of the circle of the second drain electrode 535D2 can be 2.5 to 2.7 mm, and preferably, can satisfy 2.62 mm, but is not limited thereto.

The second drain electrode 535D2 also overlaps with the drain overlapping area of the plurality of channels 533 of the second channel group 555 simultaneously, and reads a second drain current from the channels 533 of the plurality of second channel groups 555.

The second drain electrode 535D2 has a ring shape that simultaneously overlaps with the channels of the plurality of second channel groups 555 as a whole, but a portion thereof is cut to form a cut area. A connection portion of the common source electrode 535S and a connection portion of the first drain electrode 535D1 passes through the cut area of the second drain electrode 535D2.

In this situation, an extension portion that protrudes from a portion of the second drain electrode 535D2 and extends to the outside of the sensor area is further included. The connection portion of the second drain electrode 535D2 also extends to the outside and is connected to the second drain pad 511D2.

The extension portion of the first and second drain electrodes 535D1, 535D2 and the source electrode 535S is extended to the outside of the sensor area as shown in FIG. 16, and is connected to each of the first and second drain pads and the source pad 511D1, 511D2, 511S disposed in the upper corner area and the lower corner area.

Meanwhile, a gate electrode 535G is formed along the circumference of an imaginary circle having a larger diameter surrounding the second drain electrode 535D2.

The diameter of the circle of the gate electrode 535G can satisfy 3 to 3.9 mm (e.g., 3.45 mm), when it is assumed that the width of the biosensor chip 500B is 6 mm.

The diameter of the circle of the gate electrode 535G can satisfy ½ to ⅗ of the width of the biosensor chip 500B.

The gate electrode 535G has the largest area and can occupy ⅕ to ¼ or more of the sensor area. In particular, it can satisfy ½ or more of the exposed area exposed by the distal end of the accommodating portion.

Thus, when the gate electrode 535G has the largest area and is exposed by the accommodating portion 119, ions in the specimen that are charged by the bias voltage transmitted by the gate electrode 535G increase as the contact area with the specimen increases. Accordingly, the specimen is easily biased, and the reactivity of the channel is improved.

The gate electrode 535G is formed to be spaced apart from the source electrode, the gate electrode 535S, 535D1, 535D2 and the channel area 550.

The gate electrode 535G also forms a passage so that the connection portion of the drain electrodes and the source electrode 535S, 535D1 and 535d2 are connected to the correspond pad 511S, 511D1 or 511D2, and has one end that is disconnected, and has a connection portion of the gate electrode 535G which protrudes from the outer circumferential surface and extends to the gate pad 511G.

In order to integrate the gate electrode 535G and secure an area, the connection portion of the source electrode and the drain electrodes 535S, 535D1, 535D2 can be disposed as close to each other as possible and formed or patterned from a same metal layer.

Thus, a process step can be reduced, and a process time and cost can be reduced by simultaneously forming four electrodes 535S, 535D1, 535D2, and 535G that do not overlap each other.

The metal layer can be formed of at least one of Ni, Zn, Pd, Ag, Cd, Pt, Ga, In, and Au, but is not limited thereto.

A passivation layer 536 is formed on the electrode 535S, 535D1, 535D2, and 535G, and exposes only a plurality of channel areas 550, the gate electrode 535G, and a plurality of pads 511 in the biosensor chip 500, and covers all other area. Only the gate electrode 535G and the channel areas are exposed in the sensor area 530 to induce a reaction by directly contacting the specimen.

Each pad 511 formed in the corner area is exposed in an insulated state from each other, and electrically in contact with each pad 158 of the circuit board 150 through a connecting member 140.

Probe material 610 is attached to the channel area of each of the channel groups 554 and 555 exposed as described above to activate the sensor.

The probe material 610 is a material that reacts specifically to a target material to be detected by the sensor. When the target material is an antigen, an antibody can be attached thereto, or when the target material is an antibody, an antigen can be attached thereto.

When the channel 533 is formed of graphene, a linker material can be attached for smooth connection between the probe material 610 and graphene, and a process of attaching the probe material 610 after attaching a linker material on graphene is defined as an activation process.

The linker material is different depending on the material constituting the channel 533 and the probe material 610, and in the situation of graphene, it can be a polymer structure having a nano size, for example, can be formed of at least one of polyurethane, polydimethylsiloxane, Norland Optical Adhesives NOA, epoxy, polyethylene terephthalate, polymethyl methacrylate, polyimide, polystyrene, polyethylene naphtharate, polycarbonate, and combinations thereof.

In addition, the linker material can be formed of a combination of polyurethane and NOA (e.g. NOA 68). However, the linker material is not limited thereto, and can be made of various polymers having flexibility.

As shown in FIG. 19, in the multi-target biosensor chip 500B, the probe materials attached to the channel areas of each channel group 554 and 555 are different from each other.

That is, a first probe material for detecting a first target material 660 is attached to the channel area of the first channel group 554, and a second probe material for detecting a second target material 670 is attached to the channel area of the second channel group 555 (e.g., the second target material 670 can be different than the first target material 660).

When one specimen is accommodated in the accommodating portion 119, a current value of the first drain electrode 535D1 or the second drain electrode 535D2 changes according to the existing of the first target material 660 or the second target material 670 in the specimen.

The source electrode 535S receives a source voltage and the gate electrode 535G receives a gate voltage by the voltage applied to each pad 511.

The gate electrode 535G is exposed to the accommodating portion 119 and comes into contact with the specimen provided from the outside to apply a bias voltage to the specimen. Therefore, the specimen exists in a state of being partially charged with respect to the voltage of the gate electrode 535G.

FIG. 20A shows the current value IDS1 of the first drain pad, and FIG. 20B shows the current value IDS2 of the second drain pad.

When both the first and second target materials 660 and 670 do not exist in the specimen, the drain current value IDS1 read from the first drain electrode 535D and the drain current value IDS2 read from the second drain electrode 535D all have a first value I1, which is defined as a reference current.

At this time, when the first target material 660 does exist in the specimen 600, the channel 533 of the first channel group 554 is charged with a specific carrier as the first target material 660 and the first probe material react. Accordingly, as the drain current IDS1 read from the first drain electrode 535D1 increases, it has a second value I2 of FIG. 20A, thus indicating a positive reading for the presence of the first target material 660.

In addition, when the second target material 670 does exist in the specimen 600, the channel 533 of the second channel group 555 is charged with a specific carrier as the second target material 670 and the second probe material react. Accordingly, as the drain current IDS2 read from the second drain electrode 535D2 increases, it has a third value I3 of FIG. 20B, thus indicating a positive reading for the presence of the second target material 670.

In this situation, since the amount of accumulated charge is proportional to the area of the channel 533, the value of drain current can be amplified as the number of channels 533 detecting the same target material increases.

In addition, since the plurality of channels 533 are spaced apart from each other, even when one channel 533 does not operate, the existence of the target material can be recognized by causing the drain current IDS to increase or decrease in one or more other channels 533.

In addition, it is possible to detect different target materials 660 and 670 by one biosensor chip 500B, by reading a drain current IDS for the plurality of channels 533 to which different reactants for detecting different target materials are attached, respectively.

In the biosensor chip 500B, both the gate electrode 535G and the channel area of the first and second channel groups 554 and 555 can be exposed by the distal end opening of the accommodating portion 119 having a larger circle than the circumference of the gate electrode 535G.

In addition, a plurality of channel areas are spaced apart at the same angle in the same distance from the center O of the area opened by the accommodating portion 119 such that the specimen is uniformly contacted, and formed in a shape surrounding the source-drain electrode 535S, 535D to dispose the channel 533 between the source-drain electrodes 535S and 535D, thereby optimizing a structure.

Figure 21:
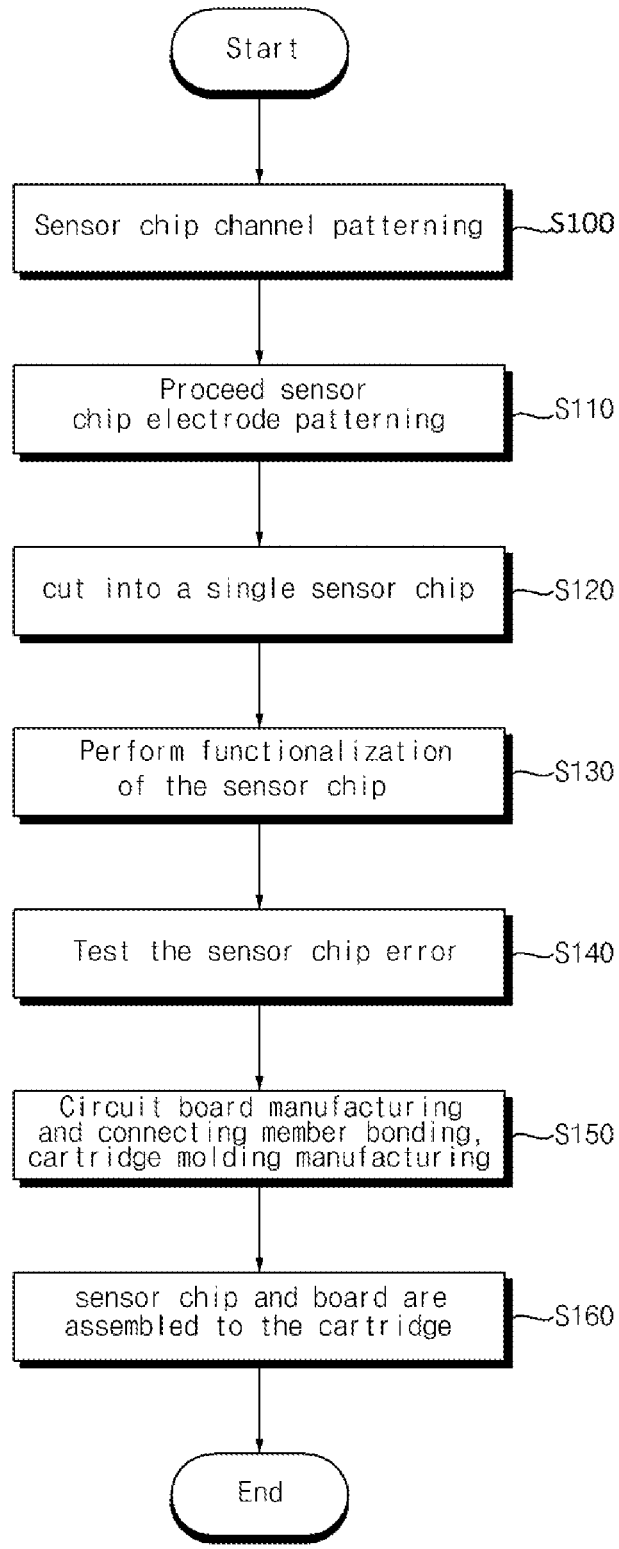
FIG. 21 is a flowchart illustrating a manufacturing process of the biosensor cartridge of FIG. 5 according to an embodiment of the disclosure.

The biosensor cartridge 100 accommodating the graphene-based multi-channel biosensor chip 500 is manufactured through the process shown in FIG. 21.

Hereinafter, a method of manufacturing a biosensor cartridge including the graphene-based multi-channel biosensor chip 500 of the present specification will be described with reference to FIG. 21.

Referring to FIG. 21, firstly, channel patterning of the biosensor chip 500 for manufacturing the biosensor chip 500 is performed on a semiconductor wafer (S100).

The manufacturing of the biosensor chip 500 is a process for manufacturing the biosensor chip 500 of FIGS. 10 to 18, and an insulating layer 532 made of oxide or nitride is formed on the semiconductor substrate 531.

When the semiconductor substrate 531 is a silicon substrate, the insulating layer 532 can be formed of silicon oxide or silicon nitride, and can be formed by various methods. For example, a silicon oxide layer can be formed on the surface through heat treatment.

A plurality of channels 533 are formed on the insulating layer 532 to be spaced apart from each other.

In this situation, one semiconductor wafer is designed to simultaneously manufacture a plurality of unit biosensor chips 500, and can perform channel patterning for manufacturing the plurality of unit biosensor chips 500.

A channel layer is patterned with a plurality of channels 550 designed for each unit biosensor chip 500.

For example, when the plurality of channels 550 are formed of graphene, graphene is stacked on the insulating layer and then graphene is patterned to form a plurality of channels 550 spaced apart from each other in the area of the unit biosensor chip 500.

Next, electrode patterning for forming electrode and pad as shown in FIGS. 10 to 18 is performed (S110). At least one metal layer among Ni, Zn, Pd, Ag, Cd, Pt, Ga, In, and Au for forming the electrode 535S, 535D, 535G is stacked, and the metal layer is patterned to simultaneously form the source electrode, the drain electrode, and the gate electrode 535S, 535D, 535G, the pad 511 connected to each electrode, and the connection portion 521 for connecting them. The passivation layer 536 is formed on the electrode 535S, 535D, and 535G, and patterning is performed to expose only the plurality of channel areas 550, the gate electrode 540, and the plurality of pads 511.

When a plurality of unit biosensor chips are generated on one semiconductor wafer as described above, a cutting process of cutting the plurality of unit biosensor chips into a single biosensor chip 500 is performed (S120).

The cutting process can be performed by laser scribing, and laser scribing can be performed together with a physical cutting process.

A single biosensor chip 500 cut from the wafer is defined as the biosensor chip 500 of FIG. 10, and functionalization of the biosensor chip 500 is performed (S130).

The functionalization of the biosensor chip 500 is defined as a process of attaching probe material that performs a specific reaction to a target material to be detected by each sensor to an exposed channel area of each biosensor chip 500.

For the functionalization of the biosensor chip 500, when the channel 533 is formed of graphene, a linker material can be attached for a smooth connection between the probe material 610 and graphene, a process of attaching the probe material 610 after attaching the linker material on the graphene is performed.

The linker material is different depending on the material constituting the channel 533 and the probe material 610, and in the situation of graphene, it can be a polymer structure having a nano size, for example, can be formed of at least one of polyurethane, polydimethylsiloxane, Norland Optical Adhesives NOA, epoxy, polyethylene terephthalate, polymethyl methacrylate, polyimide, polystyrene, polyethylene naphtharate, polycarbonate, and combinations thereof.

In addition, the linker material can be formed of a combination of polyurethane and NOA (e.g., NOA 68). However, the linker material is not limited thereto, and can be made of various polymers having flexibility.

When the functionalization of the biosensor chip 500 is completed, a test process of the biosensor chip 500 is performed (S140).

In the test of the biosensor chip 500, the biosensor chip 500 is injected into a test equipment and the test equipment is connected to the exposed pad 511, so that the alignment and electrical signals of the pad 511 are read to measure a resistance.

Thus, a physical test on whether patterning is performed accurately according to a design and a functional test on whether electrical connection is performed can be simultaneously performed.

In addition, the basic resistance value of each biosensor chip 500 is received, and a failure can be determined according to whether a corresponding basic resistance value is within a certain range.

When such an error check is finished, the failure sensor chip is classified and only the biosensor chip 500 that passed the check can be used as a valid chip.

Meanwhile, the circuit board 150 can be manufactured through a separate process. As described above, in the circuit board 150, a base member, which is the base material of the circuit board 150, is cut and punched according to the design of the circuit board 150, and a circuit pattern is formed in one side of the base member to complete the circuit board 150.

In this situation, one side of the circuit board 150 is disposed as a rear surface, and the connection pad 158, which is a part of the circuit pattern, is exposed on the rear surface.

The connecting members 140 are respectively attached to the exposed connection pad 158 according to a preset number (S150).

The bonding of the pad 158 and a first surface of the connecting member 140 can be performed by soldering to simultaneously satisfy the electrical and physical attachment. Accordingly, a second surface of the connecting member 140 is maintained as a free end.

Meanwhile, the upper housing 110 and the lower housing 120 can be manufactured through a separate process.

Separate molds can be manufactured respectively for the upper housing 110 and the lower housing 120 to perform a molding process.

Next, in a state in which the biosensor chip 500 is disposed in the area of the biosensor chip 500 of the lower housing 120 of the cartridge 100 and the circuit board 150 is placed thereon, the upper housing 110 is pressed, so that the second surface of the connecting member 140 is fixed in a state of being bonded to the pad 511 of the biosensor chip 500 (S160).

Accordingly, electrical connection and physical connection between the circuit board 150 and the biosensor chip 500 are simultaneously achieved.

Through such a manufacturing process, failure of the biosensor chip 500 is firstly filtered and then assembling is performed. In the assembling step, a high-temperature process by wire bonding is not applied, so that the functionalized biosensor chip 500 is prevented from being deteriorated due to heat (e.g., a mechanical connection for the biosensor chip 500 can be carried out).

In addition, since a process for protecting a device by performing plastic molding is not added after wire bonding of the biosensor chip 500, deterioration of the probe material of the biosensor chip 500 due to high temperature is prevented.

Figure 22:
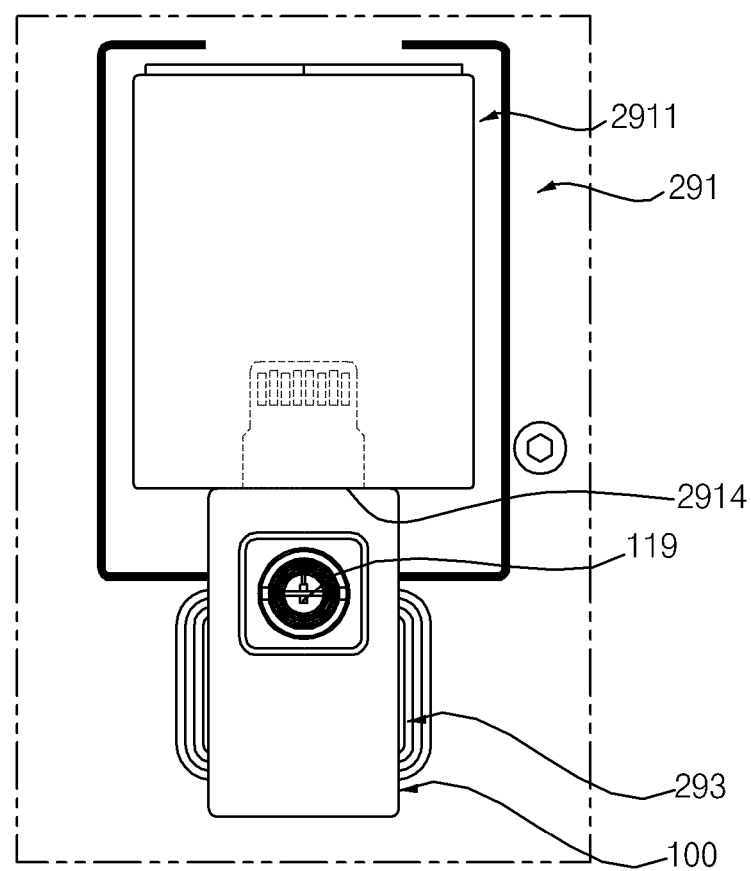
FIG. 22 is a coupling diagram in which the biosensor cartridge is coupled to the biosensor diagnostic device in the biosensor system of FIG. 1 according to an embodiment of the disclosure.

The biosensor cartridge 100 accommodating the graphene-based multi-channel biosensor chip 500 manufactured as described above performs the certification of the sensor cartridge 100 and the diagnosis of the specimen by inserting the connection terminal 153 of the cartridge into the insertion hole 2914 of the insertion module 2911 of the diagnostic device of FIG. 153 as shown in FIG. 22.

FIG. 22 is a coupling diagram in which the biosensor cartridge 100 is coupled to the biosensor diagnostic device 200 in the biosensor system of FIG. 1.

As shown in FIG. 22, when a test target specimen is received in the accommodating portion 119 of the biosensor cartridge 100 in the biosensor system according to the present embodiment, the connection terminal 153 of the biosensor cartridge 100 is inserted into the insertion hole 2914 of the cartridge insertion module 2911 of the biosensor diagnostic device 200.

As described above, the specimen can be a body fluid such as saliva or sweat, or blood.

When a plurality of insertion holes 2914 are disposed, the connection terminal 153 is inserted into the insertion hole 2914 of a type matching the type of the connection terminal 153.

The insertion of the cartridge connection terminal 153 can be performed in the same manner as the insertion of the USB memory as the cartridge connection terminal 153 is similar to the USB terminal.

As described above, when the biosensor cartridge 100 and the biosensor diagnostic device 200 are coupled for analysis, the state shown in FIG. 22 is maintained.

That is, the accommodating portion 119 in which the test targeting specimen is accommodated is located outside the diagnostic device 200, and transmits an electrical signal in a state in which only the connection terminal 153 is inserted into the diagnostic device 200 through the insertion hole 2914.

The rear surface 129 of the lower housing 120 of the cartridge 100 faces the front panel 291, the QR label 160 attached to the rear surface 129 of the lower housing 120 is aligned with the QR opening 293 of the front panel 291, and the QR reading module 271 is turned on so that the camera reads the QR code of the QR label 160 of the rear surface 129 of the cartridge 100 on the QR opening 293.

The operation unit 250 decodes the QR information to extract sensor information stored as QR information. In this situation, the sensor information can include the biosensor chip 500 type, linker information, probe material information, product ID, board ID, manufacturer information, manufacturing date, assembly date, test date, expiration date, manufacturing number, and the like.

The operation unit 250 can perform a certification of the biosensor cartridge 100 by at least one cloud server 400 connectable through the wireless communication module 261.

When the biosensor cartridge 100 is genuine, the correction data is downloaded from the cloud server 400, the cartridge insertion module 2911 is driven to read the detection signal of the cartridge connection terminal 153 from the sensor controller 240, the signal conversion amplifier unit 210, and the signal filtering unit 220.

At this time, the gate voltage and the source voltage are transmitted to the cartridge 100 through the sensor controller 260, and the drain current that is changed accordingly is read from the signal conversion amplifier 210.

Such read drain current value is amplified, and digitized after noise is removed, and transmitted to the operation unit 250.

A detection signal is decoded by executing a stored algorithm with respect to the drain current value which is the transmitted digitized detection signal, thereby reading whether the target material exists in the specimen currently accommodated in the cartridge 100.

At this time, the operation unit 250 downloads the correction data for a corresponding cartridge from the cloud server 400 after genuine product certification, and accordingly upgrades a corresponding algorithm, so that the optimized algorithm for the accumulated results of the same type of cartridge can be applied to the analysis.

The operation unit 250 reads the detection signal by performing the upgraded algorithm, and transmits the result to the display module 295 for visualization.

In addition, it can operate to transmit a corresponding reading result to the cloud server 400, and transmit to a connected user terminal 300, so that a user can be notified by a designated user terminal 300.

The biosensor is not easy to determine whether it is an imitation. Even if it is genuine, sensor errors are often found from test data accumulated after manufacturing and sales. Therefore, a process of classifying the biosensor cartridge 100 in which an error has occurred is required before the test proceeds.

The biosensor system of the present embodiment can check an error including a current risk to a corresponding type of the biosensor cartridge 100 through such a certification procedure.

In addition, as the insertion of cartridge 100 and the genuine product certification are performed simultaneously, certification is performed by using a separate QR reader, and then the certified cartridge is applied to the diagnostic device 200 so that two-step operation of diagnosis can be merged into one operation. Therefore, the user's convenience is increased, and the genuine product certification of cartridge and the cartridge diagnosis are performed almost simultaneously and proceeded in a state where the cartridge inserted, so that the diagnosis result of a corresponding cartridge and the information of the cartridge are not mixed and can be clearly matched.

Through the above solution, it is possible to provide a biosensor cartridge including a biosensor chip, and to form a transistor having a graphene channel, thereby expanding the sensitivity by the reaction between the target material and the reactants, and improving the reaction rate.

In addition, the graphene channel in the biosensor chip is formed as a plurality of channels spaced apart from each other, so that the reaction result is amplified and reading is easy.

In addition, it is possible to receive and transmit electrical signals while securing the maximum number of channels within a narrow chip area, by providing an optimized pattern structure of a biosensor chip having a plurality of channels in the biosensor cartridge.

In addition, a pattern structure of a biosensor chip capable of simultaneously reading a plurality of target materials is suggested in one biosensor chip, thereby providing a multi-target biosensor cartridge.

While the present invention has been particularly shown and described with reference to exemplary embodiments thereof, it will be understood by those of ordinary skill in the art that various changes in form and detail can be made herein without departing from the spirit and scope of the present invention as defined by the following claims and such modifications and variations should not be understood individually from the technical idea or aspect of the present invention.

What is claimed is:

1. A biosensor cartridge comprising:
a circuit board comprising a connection terminal configured to be electrically connected to an external diagnostic device;
a biosensor chip configured to detect a target material from an analysis specimen, and transmit an electrical signal to the connection terminal of the circuit board based on the target material being present in the analysis specimen, the biosensor chip including a reactant configured to react specifically with the target material; and
a housing enclosing the circuit board and the biosensor chip, and the connection terminal being exposed outside of the housing,
wherein the biosensor chip comprises:
a source electrode;
a drain electrode;
a plurality of channels separated from each other and disposed between the source electrode and the drain electrode, and
a passivation layer covering the source electrode and the drain electrode, and exposing the plurality of channels,
wherein a first electrode among the source electrode or the drain electrode is disposed corresponding to a center of an open area where the plurality of channels are exposed,
wherein a second electrode among the source electrode or the drain electrode surrounds at least partially the first electrode,
wherein one end of each of the plurality of channels overlaps with the source electrode and another end of each of the plurality of channels overlaps with the drain electrode, and
wherein the reactant is attached to a plurality of channel areas, which are exposed portions of each of the plurality of channels.

2. The biosensor cartridge of claim 1, wherein the biosensor chip further comprises:
a gate electrode configured to apply a bias voltage to the analysis specimen, the gate electrode being spaced apart from each of the source electrode and the drain electrode.

3. The biosensor cartridge of claim 2, wherein the source electrode and the drain electrode are formed of a same metal layer and do not overlap with the plurality of channel areas.

4. The biosensor cartridge of claim 2, wherein the housing comprises an accommodating portion for receiving the analysis specimen and exposing the plurality of channel areas and the gate electrode of the biosensor chip.

5. The biosensor cartridge of claim 4, wherein the accommodating portion has a funnel shape or an inclined area having a diameter that decreases from an upper surface of the accommodating portion, and
wherein a distal end of the accommodating portion exposes the plurality of channel areas and the gate electrode of the biosensor chip inside the housing.

6. The biosensor cartridge of claim 2, wherein the passivation layer exposes an upper portion of each of the plurality of channel areas and an upper portion of the gate electrode.

7. The biosensor cartridge of claim 6, wherein an area of the gate electrode in the open area is larger than an area of the source electrode in the open area and an area of the drain electrode in the open area.

8. The biosensor cartridge of claim 2, wherein the plurality of channels are evenly spaced apart from each other and disposed around the center of the open area.

9. The biosensor cartridge of claim 2, wherein the first electrode has a circular shape or a dot shape, and
wherein the second electrode has a ring shape that at least partially surrounds the first electrode disposed at the center of the open area.

10. The biosensor cartridge of claim 9, wherein the gate electrode at least partially surrounds the second electrode having the ring shape, and the gate electrode is spaced apart from the second electrode.

11. The biosensor cartridge of claim 9, wherein the biosensor chip further comprises a source pad, a drain pad, and a gate pad that are connected to the source electrode, the drain electrode, and the gate electrode, respectively, and
wherein the source pad, drain pad, and gate pad are formed of the same metal layer as the source electrode, the drain electrode, and the gate electrode.

12. The biosensor cartridge of claim 11, wherein the source pad, the drain pad, and the gate pad are disposed in a line at one end of the biosensor chip.

13. The biosensor cartridge of claim 11, wherein the source pad, the drain pad, and the gate pad are formed in corner areas of the biosensor chip.

14. The biosensor cartridge of claim 1, wherein the biosensor chip comprises:
a first channel group including a first group of channels among the plurality of channels attached to a first reactant configured to react with a first target material; and
a second channel group including a second group of channels among the plurality of channels attached to a second reactant configured to react with a second target material different than the first target material.

15. The biosensor cartridge of claim 14, wherein the source electrode and the drain electrode of the biosensor chip comprise:
a first drain electrode formed at a center of the open area;
a common source electrode spaced apart from the first drain electrode, and at least partially surrounding the first drain electrode; and
a second drain electrode spaced apart from the common source electrode, and at least partially surrounding the common source electrode.

16. The biosensor cartridge of claim 15, wherein the first channel group is disposed between the first drain electrode and the common source electrode, and
wherein the second channel group is disposed between the common source electrode and the second drain electrode.

17. The biosensor cartridge of claim 15, wherein each of the first channel group and the second channel group comprise a same number of channels, and
wherein the plurality of channels are spaced apart from each other.

18. The biosensor cartridge of claim 15, wherein one channel of the first channel group and one channel of the second channel group are spaced apart from each other by a spaced distance and both overlap with the common source electrode.

19. The biosensor cartridge of claim 15, wherein the first group of channels are disposed along a first radius away from the center of the open area, and
wherein the second group of channels are disposed along a second radius away from the center of the open area, the second radius being larger than the first radius.

20. A biosensor cartridge comprising:

a connection terminal configured to be electrically connected to an external diagnostic device; and a biosensor chip configured to detect a target material from an analysis specimen, wherein the biosensor chip comprises:

a source electrode, a drain electrode, a plurality of channels disposed between the source electrode and the drain electrode, the plurality of channels being separated from each other and including a reactant configured to specifically react with a specific target material, and a passivation layer covering the source electrode and the drain electrode, and exposing the plurality of channels, wherein the biosensor chip is configured to transmit an electrical signal to the connection terminal based on the specific target material being present on one or more of the plurality of channels, wherein a first electrode among the source electrode or the drain electrode is disposed corresponding to a center of an open area where the plurality of channels are exposed, wherein a second electrode among the source electrode or the drain electrode surrounds at least partially the first electrode, and wherein one end of each of the plurality of channels overlaps with the source electrode and another end of each of the plurality of channels overlaps with the drain electrode.

21. The biosensor cartridge of claim 20, wherein the biosensor chip further comprises:

a gate electrode configured to apply a bias voltage to the analysis specimen, the gate electrode being spaced apart from each of the source electrode and the drain electrode.

22. The biosensor cartridge of claim 21, wherein the first electrode has a circular shape or a dot shape, and wherein the second electrode has a ring shape that at least partially surrounds the first electrode disposed at the center of the open area.

* * * * *